United States Patent
Sheets et al.

(10) Patent No.: US 7,693,993 B2
(45) Date of Patent: Apr. 6, 2010

(54) METHOD AND SYSTEM FOR PROVIDING DYNAMIC HOSTED SERVICE MANAGEMENT ACROSS DISPARATE ACCOUNTS/SITES

(75) Inventors: Kitrick B. Sheets, Eau Claire, WI (US); Philip S. Smith, Monterey, CA (US); Stephen J. Engel, East Northport, NY (US); Yuefan Deng, Setauket, NY (US); Joseph Guistozzi, Plainview, NY (US); Alexander Korobka, Holtsville, NY (US)

(73) Assignee: Galactic Computing Corporation BVI/IBC, Hong Kong (HK)

( * ) Notice: Subject to any disclaimer, the term of this patent is extended or adjusted under 35 U.S.C. 154(b) by 1508 days.

(21) Appl. No.: 10/984,959

(22) Filed: Nov. 8, 2004

(65) Prior Publication Data
US 2005/0182838 A1    Aug. 18, 2005

Related U.S. Application Data

(63) Continuation of application No. 09/710,095, filed on Nov. 10, 2000, now Pat. No. 6,816,905.

(51) Int. Cl.
*G06F 15/16* (2006.01)
*G06F 12/00* (2006.01)
(52) U.S. Cl. .................. 709/226; 709/229; 718/106
(58) Field of Classification Search ......... 709/223–229, 709/217–218, 250; 718/105
See application file for complete search history.

(56) References Cited

U.S. PATENT DOCUMENTS

| | | | |
|---|---|---|---|
| 3,764,747 A | 10/1973 | Nakajima et al. | |
| 5,031,089 A | 7/1991 | Liu et al. | |
| 5,187,710 A | 2/1993 | Chau et al. | |
| 5,247,427 A | 9/1993 | Driscoll et al. | |
| 5,251,097 A | 10/1993 | Simmons et al. | |
| 5,351,286 A | 9/1994 | Nici | |
| 5,460,441 A | 10/1995 | Hastings et al. | |
| 5,488,541 A | 1/1996 | Mistry et al. | |
| 5,504,894 A | 4/1996 | Ferguson et al. | |
| 5,537,542 A | 7/1996 | Eilert et al. | |
| 5,548,683 A | 8/1996 | Engel et al. | |
| 5,615,329 A | 3/1997 | Kern et al. | |
| 5,696,895 A | 12/1997 | Hemphill et al. | |
| 5,745,884 A | 4/1998 | Carnegie et al. | |
| 5,774,668 A | 6/1998 | Choquier et al. | |
| 5,794,221 A | 8/1998 | Egendorf | |
| 5,819,092 A | 10/1998 | Ferguson et al. | |

(Continued)

FOREIGN PATENT DOCUMENTS

WO    WO00/04458 A    1/2000

(Continued)

OTHER PUBLICATIONS

Web site print-out: rackspace.com; 2 pages; Copyright 2000.

(Continued)

*Primary Examiner*—Zarni Maung
(74) *Attorney, Agent, or Firm*—Patterson, Thuente, Skaar & Christensen, P.A.

(57) ABSTRACT

A hosted service provider for the Internet is operated so as to provide dynamic management of hosted services across disparate customer accounts and/or geographically distinct sites.

28 Claims, 13 Drawing Sheets

U.S. PATENT DOCUMENTS

| | | | |
|---|---|---|---|
| 5,828,737 A | 10/1998 | Sawyer | |
| 5,832,222 A | 11/1998 | Dziadosz et al. | |
| 5,845,267 A | 12/1998 | Ronen | |
| 5,877,938 A | 3/1999 | Hobbs et al. | |
| 5,899,980 A | 5/1999 | Wilf et al. | |
| 5,912,802 A | 6/1999 | Nelson | |
| 5,938,732 A | 8/1999 | Lim et al. | |
| 5,946,670 A | 8/1999 | Motohashi et al. | |
| 5,948,065 A | 9/1999 | Eilert et al. | |
| 5,951,694 A | 9/1999 | Choquier et al. | |
| 5,956,391 A | 9/1999 | Melen et al. | |
| 5,956,697 A | 9/1999 | Usui | |
| 5,974,462 A | 10/1999 | Aman et al. | |
| 5,978,577 A | 11/1999 | Rierden et al. | |
| 5,999,965 A | 12/1999 | Kelly | |
| 6,006,259 A | 12/1999 | Adelman et al. | |
| 6,014,669 A | 1/2000 | Slaughter et al. | |
| 6,025,989 A | 2/2000 | Ayd et al. | |
| 6,035,281 A | 3/2000 | Crosskey et al. | |
| 6,035,356 A | 3/2000 | Khan et al. | |
| 6,067,545 A | 5/2000 | Wolff | |
| 6,067,580 A | 5/2000 | Aman et al. | |
| 6,070,191 A | 5/2000 | Narendran et al. | |
| 6,088,727 A | 7/2000 | Hosokawa et al. | |
| 6,092,178 A | 7/2000 | Jindal et al. | |
| 6,094,351 A | 7/2000 | Kikinis | |
| 6,094,680 A | 7/2000 | Hokanson | |
| 6,097,882 A | 8/2000 | Mogul | |
| 6,108,703 A | 8/2000 | Leighton et al. | |
| 6,167,446 A | 12/2000 | Lister et al. | |
| 6,173,322 B1 | 1/2001 | Hu | |
| 6,185,598 B1 | 2/2001 | Farber et al. | |
| 6,374,297 B1 | 4/2002 | Wolf et al. | |
| 6,452,809 B1 | 9/2002 | Jackson et al. | |
| 6,463,454 B1 | 10/2002 | Lumelsky et al. | |
| 6,532,488 B1 | 3/2003 | Ciarlante et al. | |
| 6,606,253 B2 | 8/2003 | Jackson et al. | |
| 6,625,639 B1 | 9/2003 | Miller et al. | |
| 6,718,359 B2 | 4/2004 | Zisapel et al. | |
| 6,816,903 B1 * | 11/2004 | Rakoshitz et al. | 709/226 |
| 6,816,905 B1 | 11/2004 | Sheets et al. | |
| 6,938,256 B2 | 8/2005 | Deng et al. | |
| 7,032,241 B1 * | 4/2006 | Venkatachary et al. | 726/4 |
| 7,185,112 B1 * | 2/2007 | Kuranari et al. | 709/249 |
| 2003/0039237 A1 * | 2/2003 | Forslow | 370/352 |
| 2005/0076214 A1 * | 4/2005 | Thomas et al. | 713/170 |
| 2007/0140242 A1 * | 6/2007 | DiGiorgio et al. | 370/390 |

FOREIGN PATENT DOCUMENTS

| | | |
|---|---|---|
| WO | WO 01/67707 A3 | 3/2001 |
| WO | WO 01/67707 A2 | 9/2001 |
| WO | WO 02/08891 A2 | 1/2002 |

OTHER PUBLICATIONS

*Management of the Access Network and Service Provisioning*, Jani Hursti, Seminar in Networking, Helsinki University of Technology, 20 pgs.; Apr. 1999.

Web site print-out: *Luminate Introduces Luminate.Net e-Service*, Luminate, Inc., 2 pgs.; Copyright 2000.

*A New Twist On Hosting: Luminate Pitches Its Enterprise Management Services*; Chris Gonsalves, PC Week Online, 2 pgs.; Mar. 2000.

Web site print-out: Lightspeed Systems, Corporate Overview, 3 pgs., Copyright 1999.

Web site print-out: *USi Complex Web Hosting Solution and Lattice Communications*, Usinternetworking, Inc., 2 pgs.; not dated.

Web site print-out: table of contents and chapter abstracts for—*ISP Survival Guide: Stratetgies for Running a Competitive ISP*, Geoff Huston, Wiley Computer Publishing, 16 pgs.; Oct. 1998.

Web site print-out: *Remedy AR System Integration Module for PATROL*, BMC Software, Inc., 2 pages, Copyright 2001.

Web site print-out: *PATROL® SRM: The Foundation of Application-Centric Storage Management@*, BMC Software, Inc., 2 pgs.; Copyright 2001.

Web site print-out: *PATROL® for Performance Management-Prediction in Action*, BMC Software, Inc., 2 pgs.; Copyright 2001.

Web site print-out: Frequently Asked Questions—Overview of PATROL®., BMC Software, Inc., 4 pgs.; Copyright 2001.

*Excite@Home LaunchHes Free Service for Merchants*, Andrea Orr, MicroTimes Magazine, plus web site print-out; 3 pgs.; Aug. 2000.

Web site print-out: Ascendant Solutions, Inc. Fact Sheet, Ascendant Solutions, Inc.; 4 pgs.; Copyright 1998-2000.

Web site print-out: *Comprehensive Hosting Solution for ISV s*, ebaseone Corporation, 3 pgs.; Copyright 2000.

*The Landlords of Cyberspace*, Christopher Heun, informationweek.com; 3 pgs.; Jul. 2000.

Magazine advertisment : ISP Upgrade, CAIS Software Solutions, 3 pgs.; Copyright 1999.

Brochure: Applicast™., Applicast, Inc.; 6 pgs.; Copyright 1999.

Web site print-out: ASP Computer Systems Corp.; Data Return Corporation, 3 pgs.; Copyright 2000.

White Paper: *Stratus ftServers: Enhancing Software Reliability and Availability for Windows 2000*, Stratus Computer Systems; 10 pgs.; Copyright 2000.

Web site print-out: *Cellular MultiProcessing—Breakthrough Architecture for an Open Mainframe*, Unisys, 4 pgs.; Copyright 2000.

Web site print-out: *ClearPath Enterprise Servers—What is HMP?*, Unisys, 2 pgs.; Copyright 2000.

Brochure: HP Open View Customer Views 1.0 for Network Node Manager, Hewlett-Packard Company, 4 pgs.; Copyright 1999.

Brochure: *Get Connected*—Cable & Wireless Enhanced Solutions Provider Program, Cable & Wireless USA, Inc., 4 pgs.; Copyright 1999.

Web site print-out: Resonate®, Resonate, Inc.; 1 pg.; Copyright 1999.

Web site print-out: *ISP Power Overview*, inovaware.com, Inovaware Corporation; 2 pgs.; copyright 1997-2000.

Web site print-out: *XaCCT Offers Multivendor, Multitechnology Billing Model for ISP Consumption*, John Morency, Network World Fusion on Network/Systems Management, Network World, Inc.; 3 pgs.; Sep. 1998.

Web site print-out: *Internet Shock Absorber*, Cable and Wireless plc., 5 pgs.; Copyright 2000.

Web site print-out *Epoch Internet Introduces New 'Pod' Architecture, An Innovative Approach to Providing Web Hosting Services*, epoch.net, Epoch Networks, Inc., 4 pgs.; Copyright 2000.

Web site print-out: Frequently Asked Questions—Complex Web Services, USinternetworking, Inc.; 3 pgs.; Copyright 1998-1999.

Brochure: *ControlIT™.—Remote Control Without Boundaries*, Computer Associates International, Inc.; 10 pgs.; Copyright 2000.

Brochure: *HP Open View*, Hewlett-Packard Company, 16 pgs.; Copyright 1999.

White Paper: *The HP Open View Approach to Change and Configuraton Management*, Hewlett-Packard Company, 23 pgs.; Copyright 1999.

Web site print-out: *End to End Scheduling for Tivoli.RTM. Workload Scheduler and Tivoli Operations Planning and Control*, Tivoli Systems, Inc., 2 pgs. not dated.

Brochure: *Tivol®. Global Enterprise Manager—A Business-focused Approach to Systems Management*, Tivoli Systems, Inc.; 4 pgs.; Copyright 2000.

Web site print-out: White Paper: *Tivoli Service Provider Solutions*, Tivoli Systems, Inc.; 24 pgs.; Copyright 1999.

Brochure: *Tivoli®. Cross-Site for Security*, Tivoli Systems, Inc.; 4 pgs.; Copyright 2000.

Brochure: *Tivoli® Cross-Site for Deployment—Using the Internet as a Valuable Deployment Tool*, Tivoli Systems, Inc.; 4 pgs.; Copyright 2000.

Brochure: *Tivoli® Cross-Site for Availability*, Tivoli Systems, Inc.; 4 pgs.; Copyright 1999.

Brochure: *Tivoli Problem Management Suite*, Tivoli Systems, Inc.; 4 pgs.; Copyright 1999.

Brochure: *Tivoli® Distributed Monitoring—Automated, Consistent Availability Solution*, Tivoli Systems, Inc.; 4 pgs.; Copyright 2000.

Brochure: *Tivoli Technical Brief for Service Providers*, Tivoli Systems, Inc., 7 pgs.; Copyright 1999.

Brochure: *Tivoli Cross-Site—Internet Application Management Technical Brief*, Tivoli Systems, Inc.; 22 pgs.; Copyright 1999.

U.S. Appl. No. 09/709,820, filed Nov. 10, 2000, Rex Jackson.

U.S. Appl. No. 09/710,095, filed Nov. 10, 2000, Kitrick Sheets.

U.S. Appl. No. 09/765,766, filed Jan. 18, 2001, Deng Yuefan.

U.S. Appl. No. 09/907,520, filed Jul. 17, 2001, Rex Jackson.

U.S. Appl. No. 10/244,450, filed Sep. 16, 2002, Rex Jackson.

U.S. Appl. No. 11/202,644, filed Aug. 12, 2005, Deng Yuefan.

ADSM: A Multi-Platform, Scalable, Backup and Archive mass Storage System; Luis-Felipe Cabrera et al.; 1063-6390/95, 1995 IEEE; pp. 420-427.

Web site print-out; *Coblat RaQ*, Cobalt Network Systems; 2 pgs. © 2001.

Web site print-out: HP'S Answer for Portal Performance—A-class Servers; Hewlett-Packard Company, 2 pgs. © 2000.

White paper: IBM Netfinity X-architecture, IBM Corporation; 22 pgs.; © 1998.

Brochure: ChatCom's ChatterBox Products, ChatCom, Inc.; 2 pgs. Undated.

U.S. PAIR File Wrapper History for U.S. Appl. No. 09/709,820, filed Nov. 10, 2000.

U.S. PAIR File Wrapper History for U.S. Appl. No. 09/710,095, filed Nov. 10, 2000.

U.S. PAIR File Wrapper History for U.S. Appl. No. 09/765,766, filed Jan. 18, 2001.

U.S. PAIR File Wrapper History for U.S. Appl. No. 09/907,520, filed Jul. 17, 2001.

U.S. PAIR File Wrapper History for U.S. Appl. No. 10/244,450, filed Sep. 16, 2002.

U.S. PAIR File Wrapper History for U.S. Appl. No. 11/202,644, filed Aug. 12, 2005.

* cited by examiner

METHOD AND SYSTEM FOR PROVIDING DYNAMIC HOSTED SERVICE MANAGEMENT ACROSS DISPARATE ACCOUNTS/SITES

CLAIM TO PRIORITY

The present application is a continuation application of U.S. patent application Ser. No. 09/710,095, filed Nov. 10, 2000, now U.S. Pat. No. 6,816,905 entitled, "Method and System for Providing Dynamic Hosted Service Management Across Disparate Account/Sites," the contents of which is hereby incorporated by reference in its entirety.

FIELD OF THE INVENTION

The present invention relates generally to the field of data processing business practices. More specifically, the present invention relates to a method and system for providing dynamic management of hosted services across disparate customer accounts and/or geographically distinct sites.

BACKGROUND OF THE INVENTION

The explosive growth of the Internet has been driven to a large extent by the emergence of commercial service providers and hosting facilities, such as Internet Service Providers (ISPs), Application Service Providers (ASPs), Independent Software Vendors (ISVs), Enterprise Solution Providers (ESPs), Managed Service Providers (MSPs) and the like. Although there is no clear definition of the precise set of services provided by each of these businesses, generally these service providers and hosting facilities provide services tailored to meet some, most or all of a customer's needs with respect to application hosting, site development, e-commerce management and server deployment in exchange for payment of setup charges and periodic fees. In the context of server deployment, for example, the fees are customarily based on the particular hardware and software configurations that a customer will specify for hosting the customer's application or website. For purposes of this invention, the term "hosted services" is intended to encompass the various types of these services provided by this spectrum of service providers and hosting facilities. For convenience, this group of service providers and hosting facilities shall be referred to collectively as Hosted Service Providers (HSPs).

Commercial HSPs provide users with access to hosted applications on the Internet in the same way that telephone companies provide customers with connections to their intended caller through the international telephone network. The computer equipment that HSPs use to host the applications and services they provide is commonly referred to as a server. In its simplest form, a server can be a personal computer that is connected to the Internet through a network interface and that runs specific software designed to service the requests made by customers or clients of that server. For all of the various delivery models that can be used by HSPs to provide hosted services, most HSPs will use a collection of servers that are connected to an internal network in what is commonly referred to as a "server farm," with each server performing unique tasks or the group of servers sharing the load of multiple tasks, such as mail server, web server, access server, accounting and management server. In the context of hosting websites, for example, customers with smaller websites are often aggregated onto and supported by a single web server. Larger websites, however, are commonly hosted on dedicated web servers that provide services solely for that site. For general background on the Internet and HSPs, refer to Geoff Huston, *ISP Survival Guide: Strategies For Running A Competitive ISP*, (1999).

As the demand for Internet services has increased, there has been a need for ever-larger capacity to meet this demand. One solution has been to utilize more powerful computer systems as servers. Large mainframe and midsize computer systems have been used as servers to service large websites and corporate networks. Most HSPs tend not to utilize these larger computer systems because of the expense, complexity, and lack of flexibility of such systems. Instead, HSPs have preferred to utilize server farms consisting of large numbers of individual personal computer servers wired to a common Internet connection or bank of modems and sometimes accessing a common set of disk drives. When an HSP adds a new hosted service customer, for example, one or more personal computer servers are manually added to the HSP server farm and loaded with the appropriate software and data (e.g., web content) for that customer. In this way, the HSP deploys only that level of hardware required to support its current customer level. Equally as important, the HSP can charge its customers an upfront setup fee that covers a significant portion of the cost of this hardware. By utilizing this approach, the HSP does not have to spend money in advance for large computer systems with idle capacity that will not generate immediate revenue for the HSP. The server farm solution also affords an easier solution to the problem of maintaining security and data integrity across different customers than if those customers were all being serviced from a single larger mainframe computer. If all of the servers for a customer are loaded only with the software for that customer and are connected only to the data for that customer, security of that customer's information is insured by physical isolation.

For HSPs, numerous software billing packages are available to account and charge for these metered services, such as XaCCT from rens.com and HSP Power from inovaware.com. Other software programs have been developed to aid in the management of HSP networks, such as IP Magic from lightspeedsystems.com, Internet Services Management from resonate.com and MAMBA from luminate.com. The management and operation of an HSP has also been the subject of articles and seminars, such as Hursti, Jani, "Management of the Access Network and Service Provisioning," Seminar in Internetworking, Apr. 19, 1999. An example of a typical HSP offering various configurations of hardware, software, maintenance and support for providing commercial levels of Internet access and website hosting at a monthly rate can be found at rackspace.com.

Up to now, there have been two approaches with respect to the way in which HSPs built their server farms. One approach is to use an homogenous group of personal computer systems (hardware and software) supplied from a single manufacturer. The other approach is to use personal computer systems supplied from a number of different manufacturers. The homogeneous approach affords the HSP advantages in terms of only having to support a single server platform, but at the same time it restricts the HSP to this single server platform. The heterogeneous approach using systems supplied from different manufacturers is more flexible and affords the HSP the advantage of utilizing the most appropriate server hardware and software platform for a given customer or task, but this flexibility comes at the cost of increased complexity and support challenges associated with maintaining multiple server platforms.

Regardless of which approach is used to populate a server farm, the actual physical management of such server farms remains generally the same. When a customer wants to increase or decrease the amount of services being provided for their account, the HSP will manually add or remove a server to or from that portion of the HSP server farm that is directly cabled to the data storage and network interconnect of that client's website. In the case where services are to be added, the typical process would be some variation of the following: (a) an order to change service level is received from a hosted service customer, (b) the HSP obtains new server hardware to meet the requested change, (c) personnel for the HSP physically install the new server hardware at the site where the server farm is located, (d) cabling for the new server hardware is added to the data storage and network connections for that site, (e) software for the server hardware is loaded onto the server and personnel for the HSP go through a series of initialization steps to configure the software specifically to the requirements of this customer account, and (f) the newly installed and fully configured server joins the existing administrative group of servers providing hosted service for the customer's account. In either case, each server farm is assigned to a specific customer and must be configured to meet the maximum projected demand for services from that customer account.

Originally, it was necessary to reboot or restart some or all of the existing servers in an administrative group for a given customer account in order to allow the last step of this process to be completed because pointers and tables in the existing servers would need to be manually updated to reflect the addition of a new server to the administrative group. This requirement dictated that changes in server hardware could only happen periodically in well-defined service windows, such as late on a Sunday night. More recently, software, such as Microsoft Windows 2000®, Microsoft® Cluster Server, Oracles® Parallel Server, Windows® Network Load Balancing Service (NLB), and similar programs have been developed and extended to automatically allow a new server to join an existing administrative group at any time rather than in these well-defined windows.

An example of how a new server can automatically join an existing administrative group is described in U.S. Pat. No. 5,951,694. In this patent, all of the servers in an administrative group are represented in a mapping table maintained by a gateway server. The mapping table identifies different service groups for the administrative group, such as mail service group, database service group, access server group, etc. The gateway server routes requests for the administrative group to the appropriate service group based on the mapping table. A new server may be added to one of the service groups by loading the appropriate software component on that server, after which the gateway server will recognize the new server and add it to the mapping table and bring the new server up to speed with the rest of the servers in that service group using a transaction log maintained for each service group. Alternatively, if one service group is experiencing a heavy workload and another service group is lightly loaded, it is possible to switch a server from one service group to another. The patent describes a software routine executing on a dedicated administrative server that uses a load balancing scheme to modify the mapping table to ensure that requests for that administrative group are more evenly balanced among the various service groups that make up the administrative group.

Numerous patents have described techniques for workload balancing among servers in a single cluster or administrative groups. U.S. Pat. No. 6,006,529 describes software clustering that includes security and heartbeat arrangement under control of a master server, where all of the cluster members are assigned a common IP address and load balancing is preformed within that cluster. U.S. Pat. Nos. 5,537,542, 5,948, 065 and 5,974,462 describe various workload-balancing arrangements for a multi-system computer processing system having a shared data space. The distribution of work among servers can also be accomplished by interposing an intermediary system between the clients and servers. U.S. Pat. No. 6,097,882 describes a replicator system interposed between clients and servers to transparently redirect IP packets between the two based on server availability and workload.

Various techniques have also been used to coordinate the operation of multiple computers or servers in a single cluster. U.S. Pat. No. 6,014,669 describes cluster operation of multiple servers in a single cluster by using a lock-step distributed configuration file. U.S. Pat. No. 6,088,727 describes cluster control in a shared data space multi-computer environment. Other patents have described how a single image of the input/output space can be used to coordinate multiple computers. U.S. Pat. No. 5,832,222 describes how a single image of the input/output space can be used to coordinate geographically dispersed computer systems. U.S. Pat. No. 6,067,545 describes a distributed file system with shared metadata management, replicated configuration database and domain load balancing, that allows for servers to fall into and out of a single domain under control of the configuration database.

While these approaches have improved the management of servers within administrative groups, domains or shared data spaces, there is no capability to extend these techniques beyond the group of servers defined for and linked to a common operating system or common shared data space. Generally, this limitation has not been considered a problem because all of these approaches are directed to larger enterprise computing systems that are managed and implemented within the computer network of a single company. Even though these approaches can be put into use by an HSP to manage the servers assigned to a particular account for a given client or customer, none of these approaches allow an HSP to manage a set of servers providing hosted services to multiple accounts for different clients or customers.

Systems for managing the operation of larger enterprise computing systems also have been developed, such as OpenView from Hewlett-Packard®, Unicenter TNG® from Computer Associates, Tivoli® from IBM, Mamba from Luminate, and Patrol from BMC Software, Inc. Generally, these systems are focused on inventory management and software deployment control issues encountered with very large numbers of computers operating within a single company or organization. Some of these operation management systems include performance monitoring solutions that query the performance of servers within the organization over the network to determine the need for additional resources or load redistribution. A similar over-the-network approach is also used to provide centralized reporting and management features. A good example of this type of operation management system that is intended to be used by HSPs is the Tivoli Service Delivery Management platform that consists of a user administration module, a software distribution module, an inventory module, an enterprise console, a security module, an enterprise manager module that provides a customizable view of all of the components in a network once they are added to the network, and a workload scheduler that allows workload to be balanced among servers sharing a common data space. All of these modules operate using an over-the-network communication scheme involving agents on the various nodes in the network that collect and report status and incident information to the other modules. Once the hardware components for a new node are physically added to the network, the various modules of the Tivoli Service Delivery Management platform can take over and manage those components on a more automatic basis. However, the process of physically adding hardware for a new node into the network remains essentially a manual process that is accomplished in the same manner as previously described.

In terms of managing the physical hardware that makes up the computer system, various approaches have been developed to automatically compensate for the failure of a hardware component within a computer network. U.S. Pat. No. 5,615,329 describes a typical example of a redundant hardware arrangement that implements remote data shadowing using dedicated separate primary and secondary computer systems where the secondary computer system takes over for the primary computer system in the event of a failure of the primary computer system. The problem with these types of mirroring or shadowing arrangements is that they can be expensive and wasteful, particularly where the secondary computer system is idled in a standby mode waiting for a failure of the primary computer system. U.S. Pat. No. 5,696, 895 describes one solution to this problem in which a series of servers each run their own tasks, but each is also assigned to act as a backup to one of the other servers in the event that server has a failure. This arrangement allows the tasks being performed by both servers to continue on the backup server, although performance will be degraded. Other examples of this type of solution include the Epoch Point of Distribution (POD) server design and the USI Complex Web Service. The hardware components used to provide these services are predefined computing pods that include load-balancing software, which can also compensate for the failure of a hardware component within an administrative group. Even with the use of such predefined computing pods, the physical preparation and installation of such pods into an administrative group can take up to a week to accomplish.

All of these solutions can work to automatically manage and balance workloads and route around hardware failures within an administrative group based on an existing hardware computing capacity; however, few solutions have been developed that allow for the automatic deployment of additional hardware resources to an administrative group. If the potential need for additional hardware resources within an administrative group is known in advance, the most common solution is to preconfigure the hardware resources for an administrative group based on the highest predicted need for resources for that group. While this solution allows the administrative group to respond appropriately during times of peak demand, the extra hardware resources allocated to meet this peak demand are underutilized at most other times. As a result, the cost of providing hosted services for the administrative group is increased due to the underutilization of hardware resources for this group.

One solution to the need for additional hosted services is the Internet Shock Absorber (ISA) service offered by Cable & Wireless. The ISA service distributes a customer's static Web content to one or more caching servers located at various Points of Presence (POPs) on the Cable & Wireless Internet backbone. Requests for this static Web content can be directed to be caching servers and the various POP locations to offload this function from the servers in the administrative group providing hosted service for that customer. The caching of static Web content, however, is something that occurs naturally as part of the distribution of information over the Internet. Where a large number of users are requesting static information from a given IP address, it is common to cache this information at multiple locations on the Internet. In essence, the ISA service allows a customer to proactively initiate the caching of static Web content on the Internet. While this solution has the potential to improve performance for delivery of static Web content, this solution is not applicable to the numerous other types of hosted services that involve interactive or dynamic information content.

Although significant enhancements have been made to the way that HSPs are managed, and although many programs and tools have been developed to aid in the operation of HSP networks, the basic techniques used by HSPs to create and maintain the physical resources of a server farm have changed very little. It would be desirable to provide a more efficient way of operating an HSP that could improve on the way in which physical resources of the server farm are managed.

SUMMARY OF THE INVENTION

The present invention is a method and system for operating a hosted service provider for the Internet in such a way as to provide dynamic management of hosted services across disparate customer accounts and/or geographically distinct sites. For each of a plurality of customer accounts, a plurality of individual servers are allocated to a common administrative group defined for that customer account. Each administrative group is configured to access software and data unique to that customer account for providing hosted services to the Internet for that customer account. The system automatically monitors the performance and health of the servers in each administrative group. At least one server from a first administrative group is automatically and dynamically reallocated to a second administrative group in response to the automatic monitoring. The automatic and dynamic reallocation of servers is accomplished by setting initialization pointers for the reallocated servers to access software and data unique to the customer account for the second administrative group, and then reinitializing the reallocated servers such that they join the second administrative group when restarted. Preferably, the performance and health of the servers in each administrative group are monitored over a separate out-of-band communication channel dedicated to interconnecting the servers across administrative groups. Each administrative group includes a local decision software program that communicates with a master decision software program that determines when and how to dynamically reallocate servers to different administrative groups in response to usage demands, available resources and service level agreements with each customer account.

In one embodiment, a system for providing the dynamic management of hosted services for multiple customer accounts includes at least five servers operably connected to an intranet. Each server includes host management circuitry providing a communication channel with at least one of the other servers that is separate from this intranet. At least four of the servers execute a local decision software program that monitors the server and communicates status information across the communication channel. At least two of the servers are allocated to a first administrative group for a first customer account and configured to access software and data unique to this first customer account, such that hosted services are provided via the Internet for this customer account. At least two of the other servers are allocated to a second administrative group for a second customer account and configured to access software and data unique to this second customer account, such that hosted services are provided via the Internet for this customer account. Preferably, at least one of the servers executes a master decision software program that collects status information from the other servers and dynamically reallocates at least one server from the first administrative group to the second administrative group in response to at least the status information.

Unlike existing load balancing systems that are limited to working within the context of a single customer account or that require large and expensive computer systems and common operating systems or shared data spaces, the present invention is capable of dynamically reallocating servers across multiple disparate customer accounts to provide hosted services with a more economical and flexible server farm arrangement. The ability of the present invention to support multiple administrative groups for multiple customers allows for an intelligent and dynamic allocation of server resources among different customer accounts.

DETAILED DESCRIPTION OF THE PREFERRED EMBODIMENTS

Figure 1:
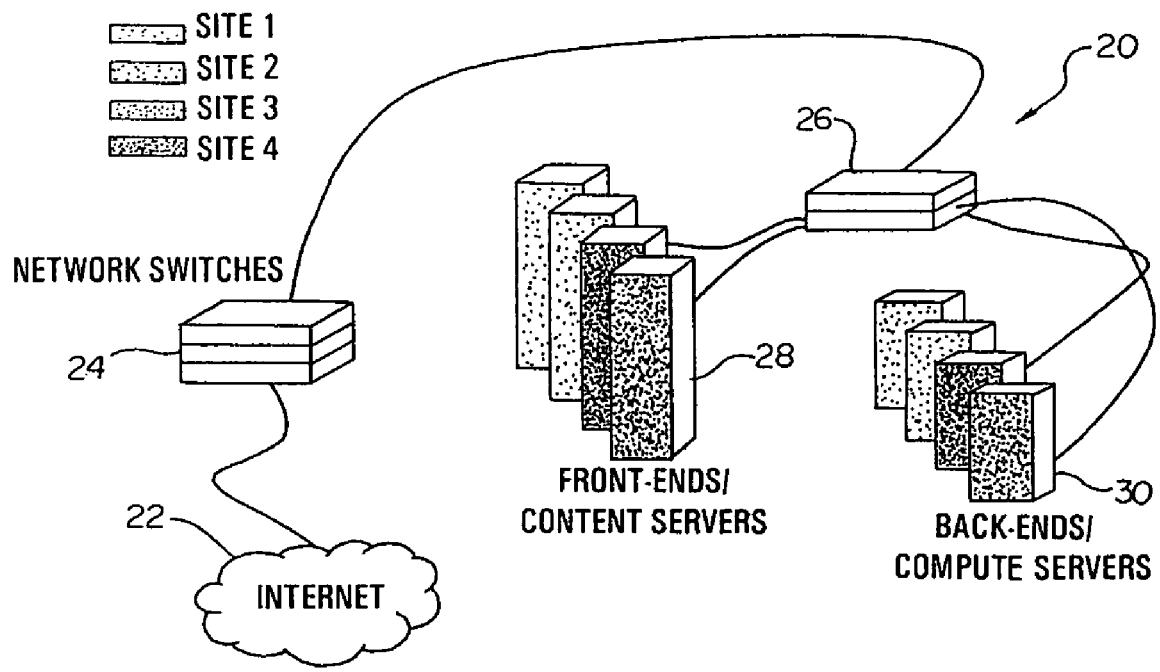
FIG. 1 is a simplified block diagram of a prior art arrangement of a server farm for a hosted service provider.

Referring to FIG. 1, a simplified functional view of an existing server farm 20 for a hosted service provider is shown. Such server farms are normally constructed using off-the-shelf hardware and software components statically configured to support the hosted service requirements of a given customer account. In this embodiment, the server farm 20 for the hosted server provider is supporting hosted services for four different customer accounts. The server farm 20 is connected to the Internet 22 by network switches/routers 24. The network switches 24 are in turn connected to internal network switches/routers 26 that form an intranet among the front-end/content servers 28 and back-end/compute servers 30 for a given customer account. All front-end/content servers 28 and back-end/compute servers 30 are connected to disk systems 32 containing data and software unique to that customer account. Depending upon the physical nature of the hardware for the servers 28, 30, the disk systems 32 may be included within the server housing, or the disk systems 32 may be housed in physically separate units directly connected to each of the servers 28, 30 or attached to more than one server 28, 30 as a storage attached network (SAN) or network attached storage (NAS) configuration.

While this arrangement makes good use of off-the-shelf hardware to construct a server farm 20 that can provide hosted services for multiple independent customer accounts, there are several significant issues exposed in this type of an arrangement. The most significant of these is the generally static nature of the allocation and deployment of system resources among different customer accounts. In order to configure and manage a single customer account within this complex, an administrator for the HSP needs to dedicate some fixed level of system resources (e.g., servers, disks, network links) to the particular customer account based on projected requirements of that customer's needs.

For example, assume a relatively simple website has been designed for any given customer account such that under a projected peak load the customer account may require three front-end servers 28 to handle user requests and a quad processor back-end server 30 to handle database queries/updates generated by these requests. For this type of website, it is likely that hardware-based technology such as f5® Big-IP®, Cisco Local Director, or Foundry® ServerIron™, or a software-based solution such as Windows® Load Balance Service (WLBS) or equivalent will be used to distribute the user requests evenly across the front-end/content servers 28. In addition, the back-end database/compute server 30 will commonly be clustered to provide some level of fault tolerance. There are a number of software products available, such as Microsoft® Cluster Server, Oracle® Parallel Server, etc., that allow websites with multiple servers to ride through hardware failures that might occur during normal operation. In addition, system monitoring tools such as Tivoli® Enterprise, HP® OpenView, etc., allow administrators to be notified when failures are detected within the server farm 20. Although these tools can be adequate for managing the hosted services within a single customer account at a given site, none of these tools allow for the management of hosted services across disparate customer accounts.

Figure 2:
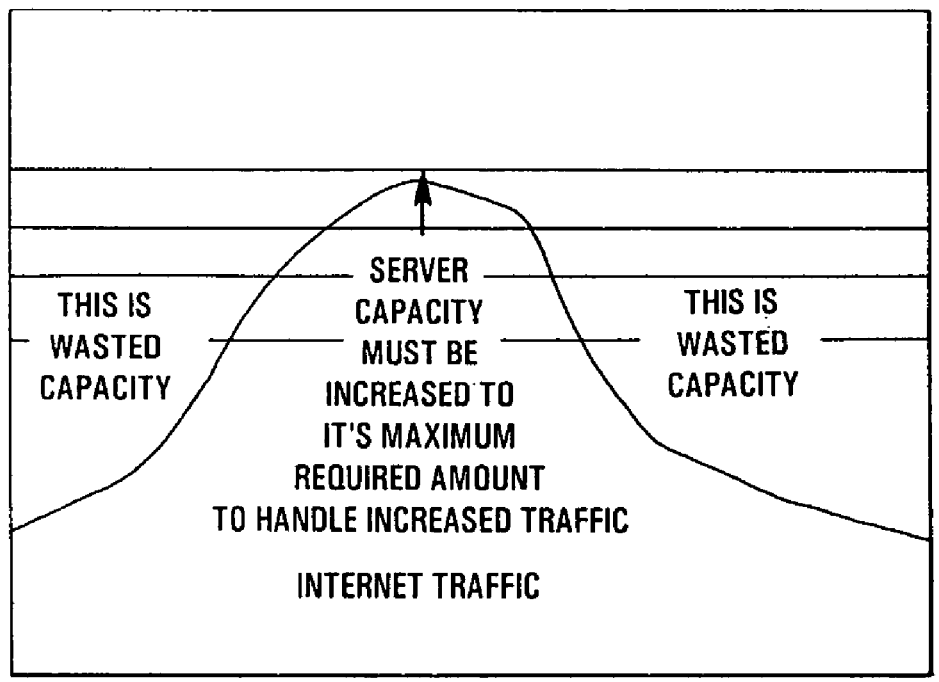
FIG. 2 is a graphic representation of Internet traffic in relation to server capacity for a prior art server farm hosting multiple customer accounts.

In the context of this example, assume that the website for this customer account is an e-commerce site designed to handle a peak load of 5000 transactions per minute. Further, assume that the websites for the remaining customer accounts in the server farm 20 have been designed to handle peak loads of 10,000, 15,000 and 5,000 transactions per minute, respectively. As shown in FIG. 2, having to design and configure each customer account to handle an anticipated peak load likely results in significant wasted capacity within the overall server farm 20. Even though the server farm 20 handling multiple customer accounts may have excess aggregate capacity, this extra capacity cannot be used to respond to hardware failures or unexpected increases in peak load from one account to the next. Resources configured for a particular customer account are dedicated to that account and to that account only. In the event that one of the front-end servers 28 for a first customer account experiences a hardware failure, Web traffic will be routed to the remaining front-end servers 28. If the customer account was busy before the hardware failure and Web traffic remains constant or increases after the failure, the remaining front-end servers 28 will quickly become overloaded by servicing their previous workload as well as the additional traffic redirected from the failed server. In a best case scenario, the system management software for the server farm 20 would notice that a server had failed and send a message to a site manager (via pager and/or e-mail) indicating the server failure. If the site manager receives the message in a timely manner and is located on-site, the site manager can physically remove the failed hardware component, install a spare hardware component that has hopefully been stockpiled for this purpose, recable the new hardware component, configure and install the appropriate software for that customer account, and allow the new hardware component to rejoin the remaining front-end servers 28. Hopefully, this process could be accomplished in less than an hour. If the message is not received in a timely manner, if the site manager is not located at the site where the server farm is located, or if there is no stockpiled spare hardware available to replace the failed unit, this process will take even longer. In the meantime, response times for users accessing the customer account are degraded and the customer account becomes increasingly vulnerable to another hardware failure during this period.

In the event that the customer account experiences an increase in demand above the anticipated peak demand for which that customer account has been configured, there are no resources available to the load balancing facilities for redistributing this increased Web traffic. All of the servers 28, 30 would be operating at peak capacity. The result is significantly degraded response times for the customer account and a possibility of "service unavailable" responses for requests that cannot be handled in a timely manner. While the inability to provide services to consumers in a timely manner is an undesirable, but perhaps manageable, problem for a business in other contexts, the additional problem of generating "service unavailable" messages for a website is that, if such messages continue to persist for whatever reason, the Internet may begin to propagate this information to numerous intermediary nodes in the network. As a result, these intermediary nodes will divert subsequent requests to the website due to their understanding that the website is "unavailable." Not only are the customers who receive the "service unavailable" message not serviced, but many other customers may never even get to the website once the customer account becomes saturated or overloaded.

Figure 3:
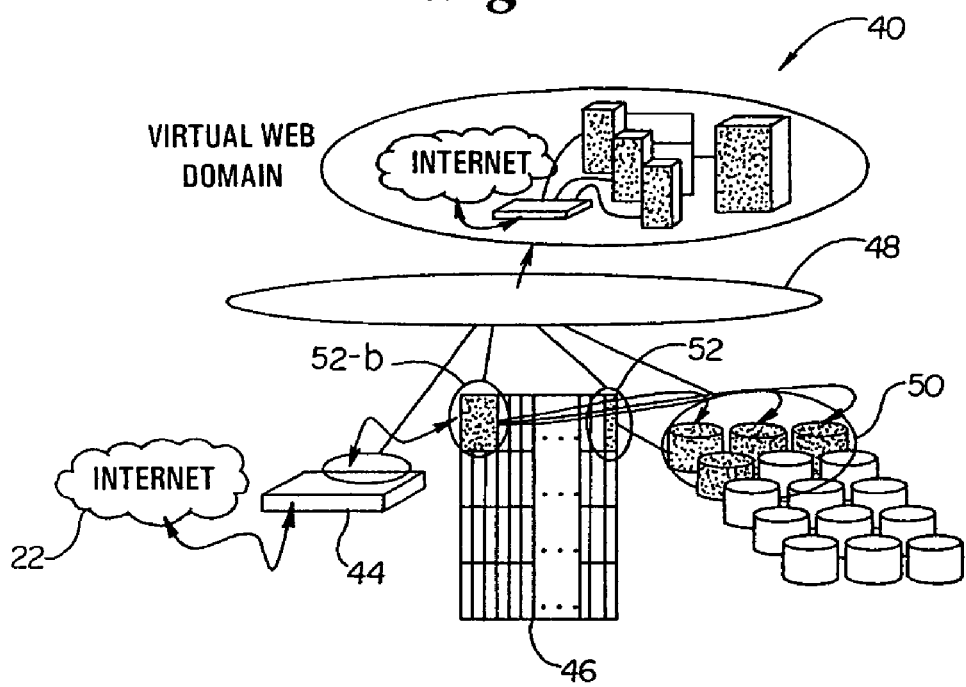
FIG. 3 is a simplified block diagram of the arrangement of a server farm in accordance with the present invention.

Referring now to FIG. 3, a server farm 40 for providing dynamic management of hosted services to multiple customer accounts will be described. As with existing server farms 20, the server farm 40 includes network switches 44 to establish interconnection between the server farm 40 and the Internet 22. Unlike existing server farm 20, however, a population of servers 46 are managed under control of an engine group manager 48. Each of the servers 46 is a stateless computing device that is programatically connected to the Internet via the network switches 44 and to a disk storage system 50. In one embodiment, the servers 46 are connected to the disk storage system 50 via a Fibre Channel storage area network (SAN). Alternatively, the servers 46 may be connected to the disk storage system 50 via a network attached storage (NAS) arrangement, a switchable crossbar arrangement or any similar interconnection technique.

Figure 4:
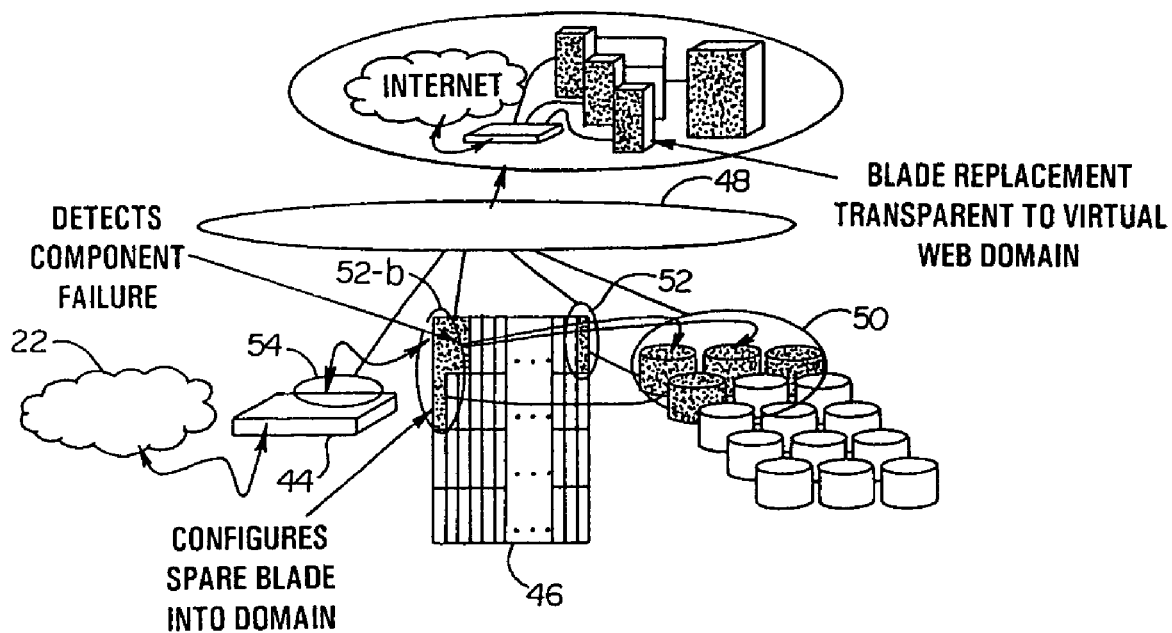
FIG. 4 is a simplified block diagram similar to FIG. 3 showing the dynamic reallocation of servers from a first customer account to a second customer account to address a hardware failure.
Figure 5:
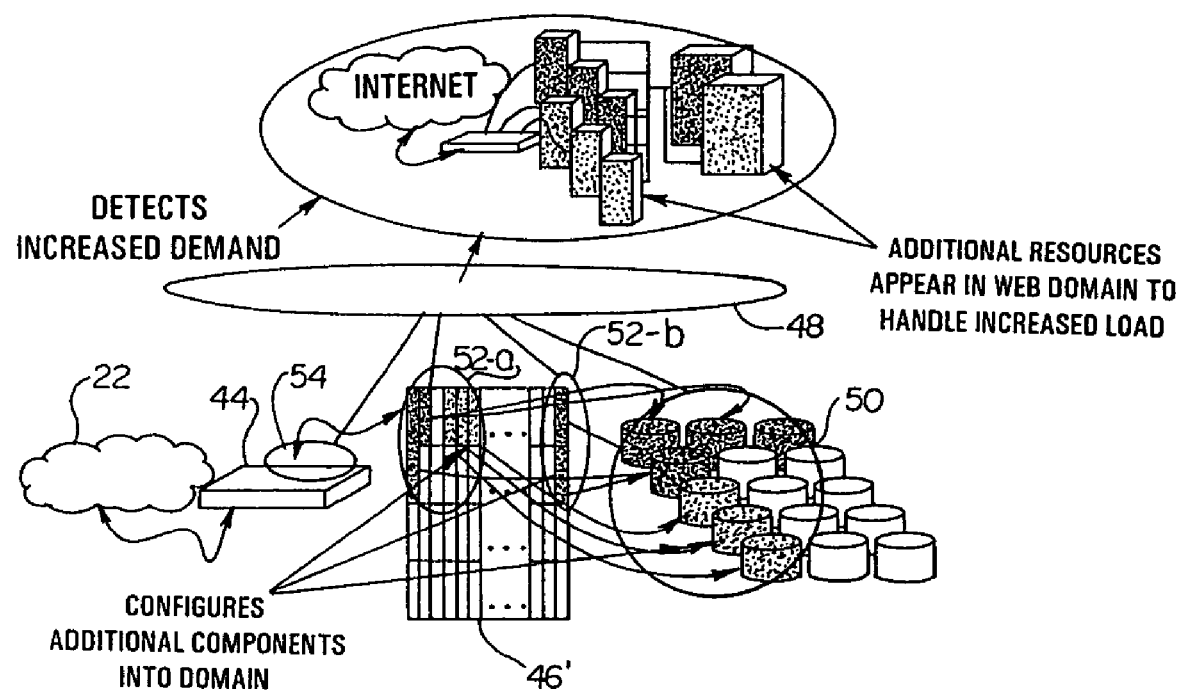
FIG. 5 is a simplified block diagram similar to FIG. 3 showing the dynamic reallocation of servers from a first customer account to a second customer account to address an increased usage demand.

As shown in FIGS. 4 and 5, the engine group manager 48 is responsible for automatically allocating the stateless servers 46 among multiple customer accounts and then configuring those servers for the allocated account. This is done by allocating the servers for a given customer account to a common administrative group 52 defined for that customer account and configured to access software and data unique to that customer account. As will be described, the engine group manager 48 automatically monitors each administrative group and automatically and dynamically reallocates servers 46' from a first administrative group 52-a to a second administrative group 52-b in response to the automatic monitoring. This is accomplished by using the engine group manager 48 to set initialization pointers for the reallocated servers 46' from the first administrative group 52-a to access software and data unique to the customer account for the second administrative group 52-b, and then reinitializing the reallocated servers 46' such that reallocated servers 46' join the second administrative group 52-b. Unlike the existing process for adding or removing hardware resources to a server farm 20, the present invention can make a reallocated server 46' available to a new administrative group 52 in as little as a few minutes. Basically, the only significant time required to bring the reallocated server 46' online will be the time required to reboot the server 46' and any time required for the load-balancing and/or clustering software to recognize this rebooted server. It will be understood that load-balancing software is more typically found in connection with front-end/content servers, whereas clustering software or a combination of clustering software and load-balancing software are more typically used in connection with back-end/compute servers. The term load-balancing software will be used to refer to any of these possible combinations.

In one embodiment, the reallocated servers 46' automatically join the second administrative group because the software for the second administrative group 52-b includes load-balancing software that will automatically add or remove a server from that administrative group in response to the server being brought online (i.e., reset and powered on) or brought off-line (i.e., reset and powered off). As previously described, this kind of load-balancing software is widely known and available today; however, existing load-balancing software is only capable of adding or removing servers from a single administrative group. In this embodiment, the engine group manager 48 takes advantage of capabilities of currently available commercial load-balancing application software to allow for the dynamic reallocation servers 46' across different administrative groups 52. Alternatively, agents or subroutines within the operating system software for the single administrative group could be responsible for integrating a reallocated server 46' into the second administrative group 52-b once the reallocated server 46' is brought online. In still another embodiment, the engine group manager 48 could publish updates to a listing of available servers for each administrative group 52.

Preferably, the engine group manager 48 will set pointers in each of the servers 46 for an administrative group 52 to an appropriate copy of the boot image software and configuration files, including operating system an application programs, that had been established for that administrative group 52. When a reallocated server 46' is rebooted, its pointers have been reset by the engine group manager 48 to point to the boot image software and configuration files for the second administrative group 52-*b*, instead of the boot image software and configuration files for the first administrative group 52-*a*.

In general, each administrative group 52 represents the website or similar hosted services being provided by the server farm 40 for a unique customer account. Although different customer accounts could be paid for by the same business or by a related commercial entity, it will be understood that the data and software associated with a given customer account, and therefore with a given administrative group 52, will be unique to that customer account. Unlike service providers which utilize large mainframe computer installations to provide hosted services to multiple customers by using a single common operating system to implement timesharing of the resources of the large mainframe computer system, each administrative group 52 consists of unique software, including conventional operating system software, that does not extend outside servers 46 which have been assigned to the administrative group 52. This distributed approach of the present invention allows for the use of simpler, conventional software applications and operating systems that can be installed on relatively inexpensive, individual servers. In this way, the individual elements that make up an administrative group 52 can be comprised of relatively inexpensive commercially available hardware servers and standard software programs.

Figure 6:
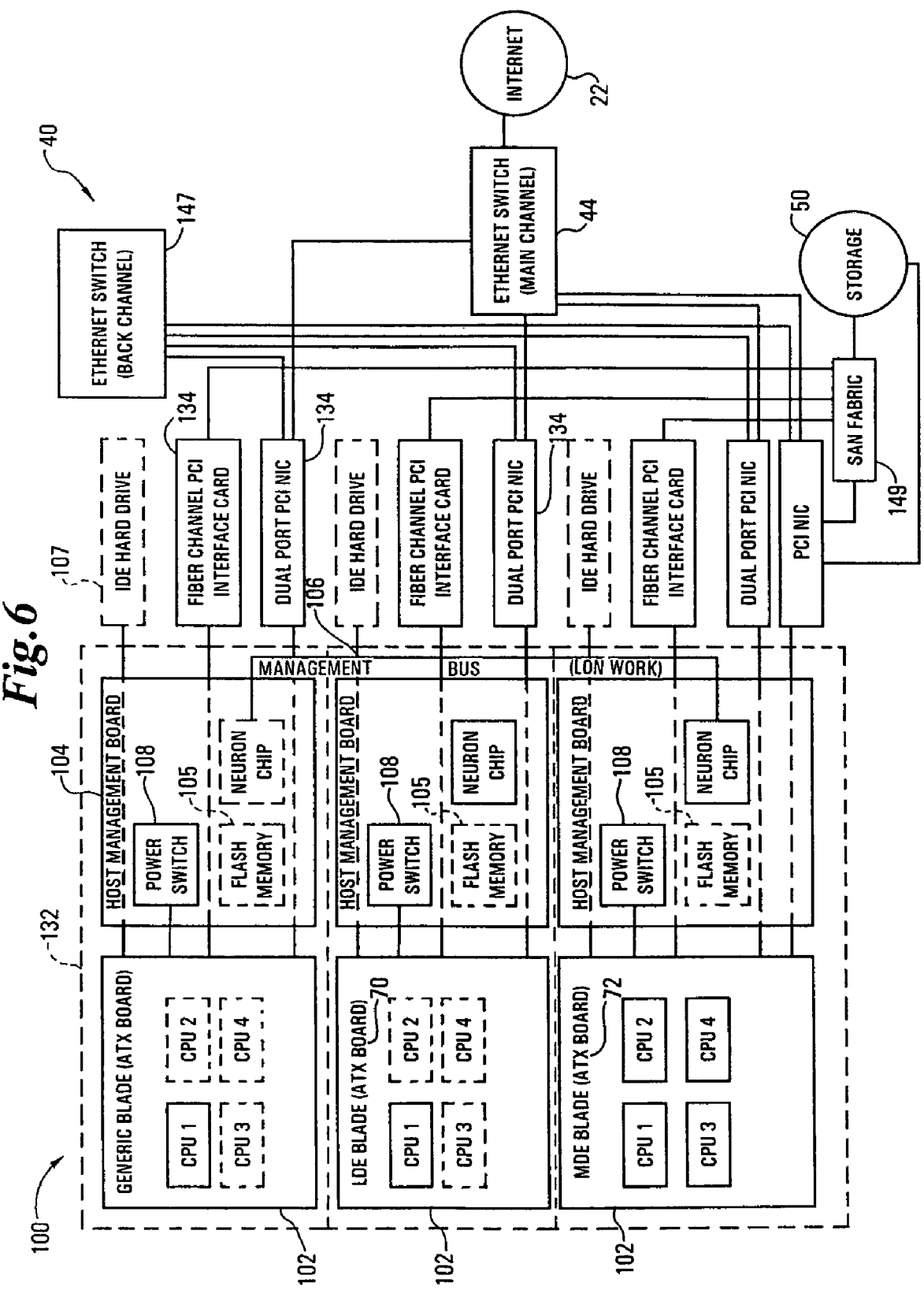
FIG. 6 is a block diagram of a preferred embodiment of the components of a server farm in accordance with the present invention.
Figure 7:
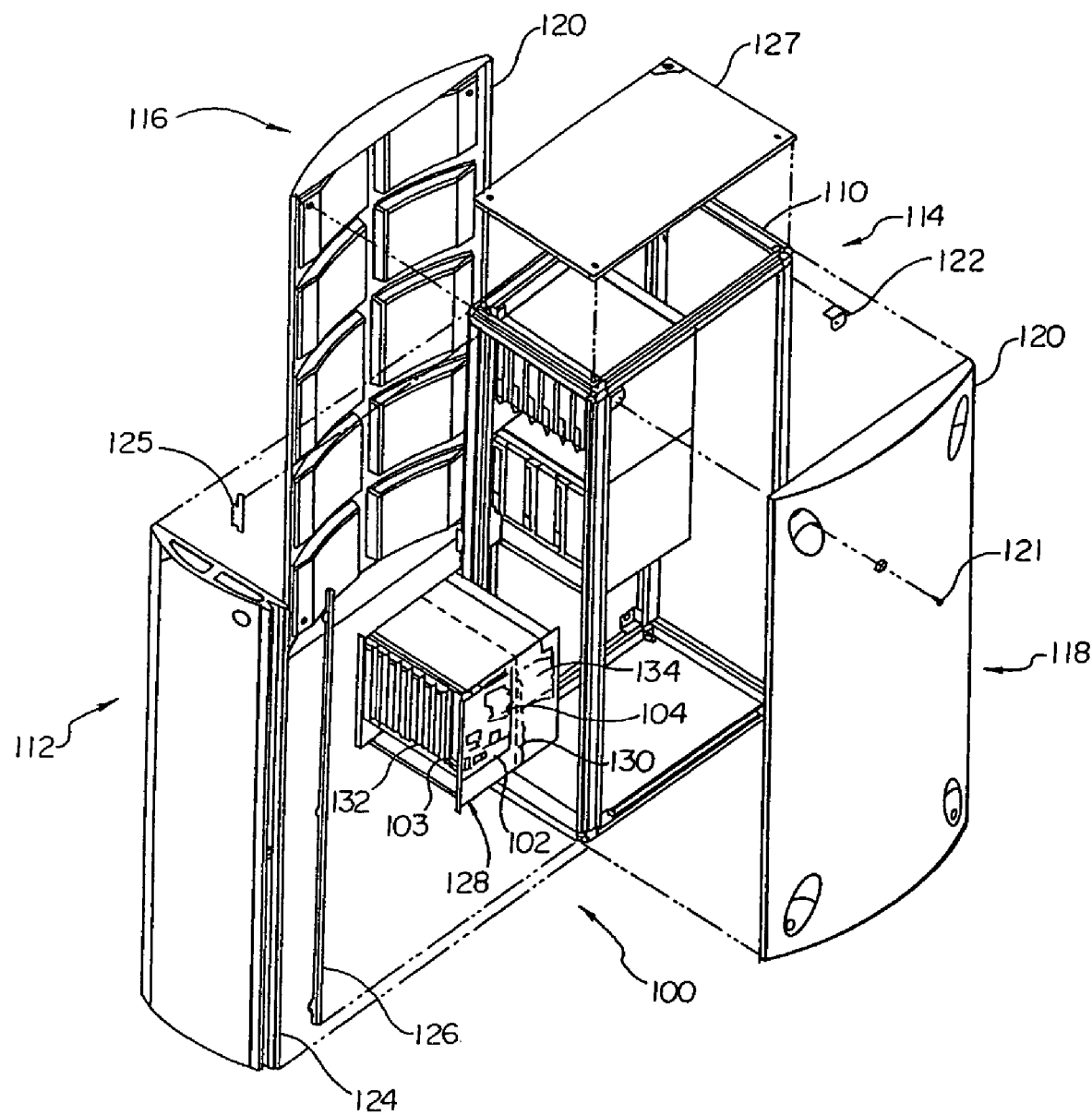
FIG. 7 is an exploded perspective view of a preferred embodiment of the hardware for the server farm in accordance with the present invention.

FIGS. 6 and 7 show a preferred embodiment of the components and hardware for the server farm 40 in accordance with the present invention. Although the preferred embodiment of the present invention is described with respect to this hardware, it will be understood that the concept of the present invention is equally applicable to a server farm implemented using all conventional servers, including the currently available 1U or 2U packaged servers, if those servers are provided with the host management circuitry or its equivalent, as will be described.

Preferably, the hardware for the server farm 40 is a scalable engine 100 comprised of a large number of commercially available server boards 102 each arranged as an engine blade 132 in a power and space efficient cabinet 110. The engine blades 132 are removably positioned in a front side 112 of the cabinet 110 in a vertical orientation. A through plane 130 in the middle of the cabinet 110 provides common power and controls peripheral signals to all engine blades 132. I/O signals for each engine blade 132 are routed through apertures in the through plane 130 to interface cards 134 positioned in the rear of the cabinet 110. The I/O signals will be routed through an appropriate interface card 134 either to the Internet 22 via the network switch 44, or to the disk storage 50. Preferably, separate interface cards 134 are used for these different communication paths.

The scalable engine can accommodate different types of server boards 102 in the same cabinet 110 because of a common blade carrier structure 103. Different types of commercially available motherboards 102 are mounted in the common blade carrier structure 103 that provides a uniform mechanical interface to the cabinet 110. A specially designed PCI host board 104 that can plug into various types of motherboards 102 has connections routed through the through plane 130 for connecting to the interface cards 134. Redundant hot-swappable high-efficiency power supplies 144 are connected to the common power signals on the through plane 130. The host board 104 includes management circuitry that distributes the power signals to the server board 102 for that engine blade 132 by emulating the ATX power management protocol. Replaceable fan trays 140 are mounted below the engine blades 132 to cool the engine 100. Preferably, the cabinet 110 accommodates multiple rows of engine blades 132 in a chassis assembly 128 that includes a pair of sub-chassis 129 stacked on top of each other and positioned on top of a power frame 146 that holds the power supplies 144. Preferably, the cabinet 110 will also include rack mounted Ethernet networks switches 44 and 147 and storage switches 149 attached to disk drives 50 over a Fibre Channel network.

It will also be understood that while the present invention is described with respect to single cabinet 110 housing engine blades 132 with server boards 102 that together with the appropriate application software constitute the various servers 46 that are assigned to a first administrative group 52-*a*, and a second administrative group 52-*b* each having at least two engine blades 132, the server farm 40 can accommodate administrative groups 52 for any number of customers depending upon the total number of servers 46 in the server farm 40. Preferably, multiple cabinets 110 can be integrated together to scale the total number of servers 46 at a given location. As will be discussed, it is also possible to link multiple cabinets 110 in geographically disparate locations together as part of a single server farm 40 operating under control of the engine group manager 48.

In the preferred embodiment, the server boards 102 of each engine blade 132 can be populated with the most recent processors for Intel®, SPARC® or PowerPC™ designs, each of which can support standard operating system environments such as Windows® NT, Windows® 2000, Linux™ or Solaris. Each engine blade 132 can accommodate one or more server boards 102, and each server board may be either a single or multiprocessor design in accordance with the current ATX form factor or a new form factor that may be embraced by the industry in the future. Preferably, the communication channel 106 is implemented a Controller Area Network (CAN) bus that is separate from the communication paths for the network switch 44 or storage switches 149. Optionally, a second fault backup communication channel 106' could be provided to allow for fault tolerance and redundant communication paths for the group manager software 48.

In a conventional server, the pointers and startup configuration information would be set by manual switches on the server board or hard-coded into PROM chipsets on the server board or stored at fixed locations on a local hard drive accessible by the server board. The management circuitry on the host board 104 is designed to have appropriate hooks into the server board 102 such that the pointers and other startup configuration information are actually supplied by the host management circuitry. Optionally, an engine blade 132 can include a local hard drive 107 that is accessed through the host board 104 such that information stored on that local hard drive 107 can be configured by the host board via the communication channel 106. Additionally, the host board 104 preferably includes power management circuitry 108 that enables the use of common power supplies for the cabinet 110 by emulating the ATX power management sequence to control the application of power to the server board 102. Preferably, a back channel Ethernet switch 147 also allows for communication of application and data information among the various server boards 102 within the server farm 40 without the need to route those communications out over the Internet 22.

In a preferred embodiment, each cabinet 110 can house up to 32 engine blades 132. In this configuration, the networks switches 44 and 147 could comprise two 32 circuit switched Ethernet network routers from Foundry®. Preferably, the networks switches 44 and 147 allow a reconfiguration of the connection between a server 46 and the networks switch 44 and 147 to be dynamically adjusted by changing the IP address for the server. With respect to the disk storage units 50, two options are available. First, unique hardware and software can be inserted in the form of a crossbar switch 149 between the engine blades 132 and the disk storage units 50 which would abstract way the details of the underlying SAN storage hardware configuration. In this case, the link between the disk storage units 50 and each blade 132 would be communicated to the crossbar switch 149 through set of software APIs. Alternatively, commercially available Fibre Channel switches or RAID storage boxes could be used to build connectivity dynamically between the blades 132 and disk storage units 50. In both alternatives, a layer of software inside the engine group manager 48 performs the necessary configuration adjustments to the connections between the server blades 132 and networks switches 147 and disk storage units 50 are accomplished. In another embodiment, a portion of the servers 46 could be permanently cabled to the network switches or disk storage units to decrease switch costs if, for example, the set of customer accounts supported by a given portion of the server farm 40 will always include a base number of servers 46 that cannot be reallocated. In this case, the base number of servers 46 for each administrative group 52 could be permanently cabled to the associated network switch 149 and disk storage unit 50 for that administrative group 52.

Referring again to FIGS. 4 and 5, it will be seen that the server farm system 40 of the present invention can dynamically manage hosted services provided to multiple customer accounts. It will be seen that there are at least five servers 46 operably connected to an intranet 54. Preferably, the intranet is formed over the same network switches 44 that interconnect the servers 46 with the Internet 22 or over similar network switches such as network switches 147 that interconnect the servers 46 to each other. Each server 46 has management circuitry on the host board 104 that provides a communication channel 106 with at least one of the other servers 46 that is separate from the intranet 54 created by the network switches 44 and/or 147.

At least four of the servers 46 are configured to execute a local decision software program 70 that monitors the server 46 and communicate status information across the communication channel 106. At least two of these servers 46 are allocated to a first administrative group 52-*a* for a first customer account and configured to access software and data unique to the first customer account to provide hosted services to the Internet for that customer account. At least another two of the servers 46 are allocated to a second administrative group 52-*b* for a second customer account and configured to access software and data unique to the second customer account to provide hosted services to the Internet for that customer account. At least one of the servers 46 executes a master decision software program 72 that collects status information from the local decision software programs 70 executing on the other servers 46. In one embodiment, a pair of servers 46 are slaved together using fault tolerant coordination software to form a fault tolerant/redundant processing platform for the master decision software program. As will be described, the master decision software program 72 dynamically reallocates at least one server 46' from the first administrative group 52-*a* to the second administrative group 52-*b* in response to at least the status information collected from the local decision software programs 70.

The servers 46 for both administrative groups 52 can be arranged in any configuration specified for a given customer account. As shown in FIG. 3, three of the servers 46 for administrative group 52-*b* are configured as front-end servers with a single server 46 being configured as the back-end/compute server for this customer account. In response to a significant increase in the peak usage activity for the customer account for the second administrative group 52-*b*, the master decision software program 72 determines that is necessary to reallocate server 46' from its current usage as a server for the first administrative group 52-*a* to being used as a back-end/compute server for the second administrative group 52-*b*. The preferred embodiment for how this decision is arrived will be described in connection with the description of the operation of the local decision software program 72. Following the procedure just described, the master decision software program 72 directs the dynamic reallocation of reallocated server 46' to the second administrative group 52-*b* as shown in FIG. 4.

Although the preferred embodiment of present invention is described in terms of reallocation of a server 46' from a first administrative group 52-*a* to a second administrative group 52-*b*, it should be understood that the present invention can also be implemented to provide for a common pool of available servers 46' that are not currently assigned to a given administrative group 52 and may be reallocated without necessarily requiring that they be withdrawn from a working administrative group 52. For example, a server farm 40 having thirty-two servers 46 could be set up to allocate six servers to each of four different customer accounts, with one server 46 executing the master decision software program 72 and a remaining pool 56 of seven servers 46 that are initially unassigned and can be allocated to any of the four administrative groups 52 defined for that server farm. Because the assignment of servers to administrative groups is dynamic during the ongoing operation of the server farm 40 in accordance with the present invention, the preferred embodiment of the present invention uses this pool 56 as a buffer to further reduce the time required to bring a reallocated server 46' into an administrative group 52 by eliminating the need to first remove the reallocated server 46' from its existing administrative group 52. In one embodiment, the pool 56 can have both warm servers and cold servers. A warm server would be a server 46 that has already been configured for a particular administrative group 52 and therefore it is not necessary to reboot that warm server to allow it to join the administrative group. A cold server would be a server that is not configured to a particular administrative group 52 and therefore it will be necessary to reboot that cold server in order for it to join the administrative group.

It should also be understood that reallocated servers 46' can be allocated to a new administrative group singly or as a group with more than one reallocated server 46' being simultaneously reallocated from a first administrative group 52-*a* to a second administrative group 52-*b*. In the context of how the networks switches 44, 147 and storage switches 149 are configured to accommodate such dynamic reallocation, it should also be understood that multiple servers 46 may be reallocated together as a group if it is necessary or desirable to reduce the number of dynamically configurable ports on the networks 44, 147 and/or storage switches 149.

One of the significant advantages of the present invention is that the process of reconfiguring servers from one administrative group 52-*a* to a second administrative group 52-*b* will wipe clean all of the state associated with a particular customer account for the first administrative group from the reallocated server 46' before that server is brought into service as part of the second administrative group 52-*b*. This provides a natural and very efficient security mechanism for precluding intentional or unintentional access to data between different customer accounts. Unless a server 46 or 46' is a member of a given administrative group 52-*a*, there is no way for that server to have access to the data or information for a different administrative group 52-*b*. Instead of the complex and potentially problematic software security features that must be implemented in a mainframe server or other larger server system that utilizes a shard memory space and/or common operating system to provide hosted services across different customer accounts, the present invention keeps the advantages of the simple physical separation between customer accounts that is found in conventional server farm arrangements, but does this while still allowing hardware to be automatically and dynamically reconfigured in the event of a need or opportunity to make better usage of that hardware. The only point of access for authorization and control of this reconfiguration is via the master decision software program 72 over the out-of-band communication channel 106.

Figure 14:
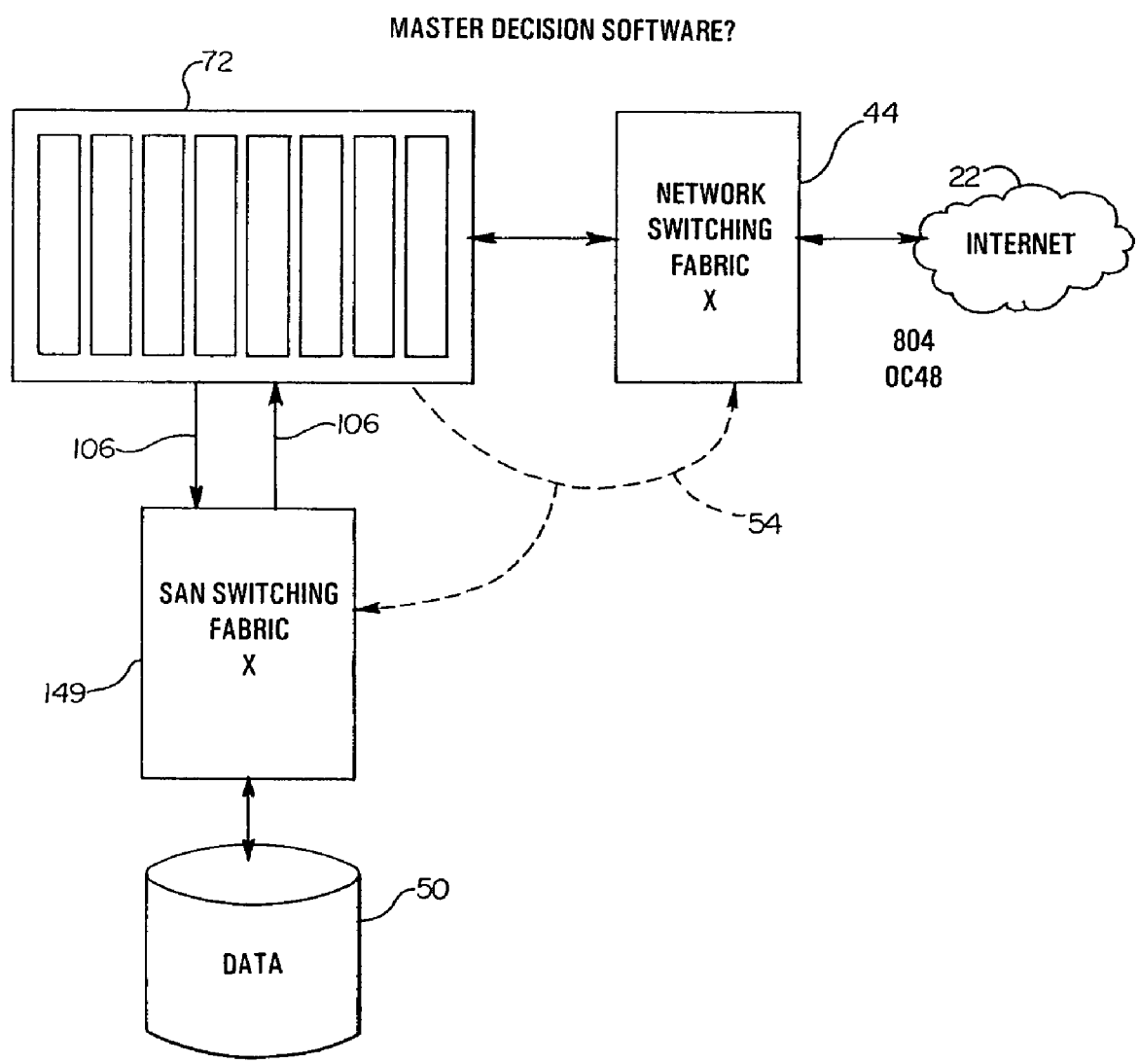
FIG. 14 is a block diagram showing the master decision software program controlling the network switch and storage unit connections.

As shown in FIG. 14, preferably each server 46 is programmatically connected to the Internet 22 under control of the master decision software program 72. The master decision software program 72 also switches the reallocated server 46' to be operably connected to a portion of the disk storage unit storing software and data unique to the customer account of the second administrative group. The use of an out-of-band communication channel 106 separate from the intranet 54 over the network switches 44 for communicating at least a portion of the status information utilized by the master decision software program 72 is preferably done for reasons of security, fault isolation and bandwidth isolation. In a preferred embodiment, the communication channel 106 is a serial Controller Area Network (CAN) bus operating at a bandwidth of 1 Mb/s within the cabinet 106, with a secondary backbone also operating at a bandwidth 1 Mb/s between different cabinets 106. It will be understood that a separate intranet with communications using Internet Protocol (IP) protocol could be used for the communication channel 106 instead of a serial management interface such as the CAN bus, although such an embodiment would effectively be over designed for the level and complexity of communications that are required of the communication channel 106 connected to the host boards 104. While it would be possible to implement the communication channel 106 as part of the intranet 54, such an implementation is not preferred because of reasons of security, fault isolation and bandwidth isolation.

Figure 8:
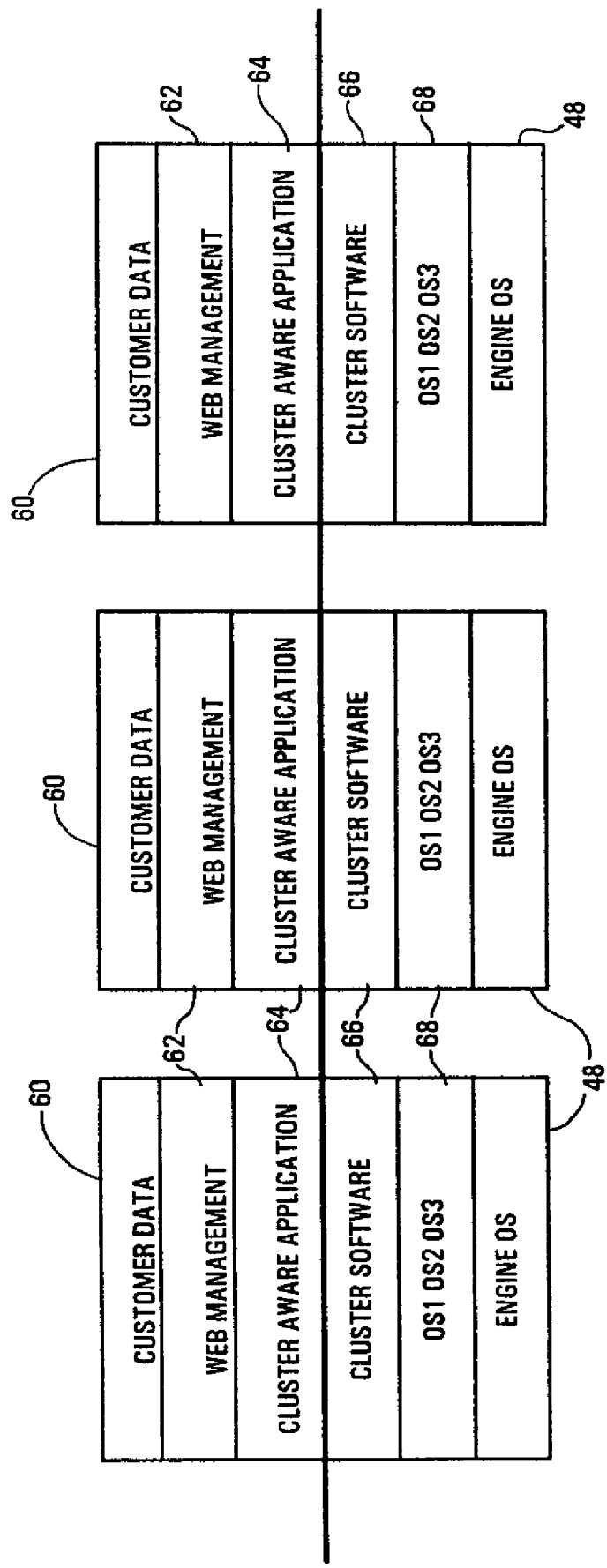
FIG. 8 is a block diagram showing the hierarchical relation of the various software layers utilized by the present invention for a given customer account.

FIG. 8 shows a block diagram of the hierarchical relation of one embodiment of the various data and software layers utilized by the present invention for a given customer account. Customer data and databases 60 form the base layer of this hierarchy. Optionally, a web data management software layer 62 may be incorporated to manage the customer data 60 across multiple instances of storage units that comprise the storage system 50. Cluster and/or load-balancing aware application software 64 comprises the top layer of what is conventionally thought of as the software and data for the customer's website. Load-balancing software 66 groups multiple servers 46 together as part of the common administrative group 52. Multiple instances of conventional operating system software 68 are present, one for each server 46. Alternatively, the load-balancing software 66 and operating system software 68 may be integrated as part of a common software package within a single administrative group 52. Above the conventional operating system software 68 is the engine operating software 48 of the present invention that manages resources across multiple customer accounts 52-*a* and 52-*b*.

Figure 9:
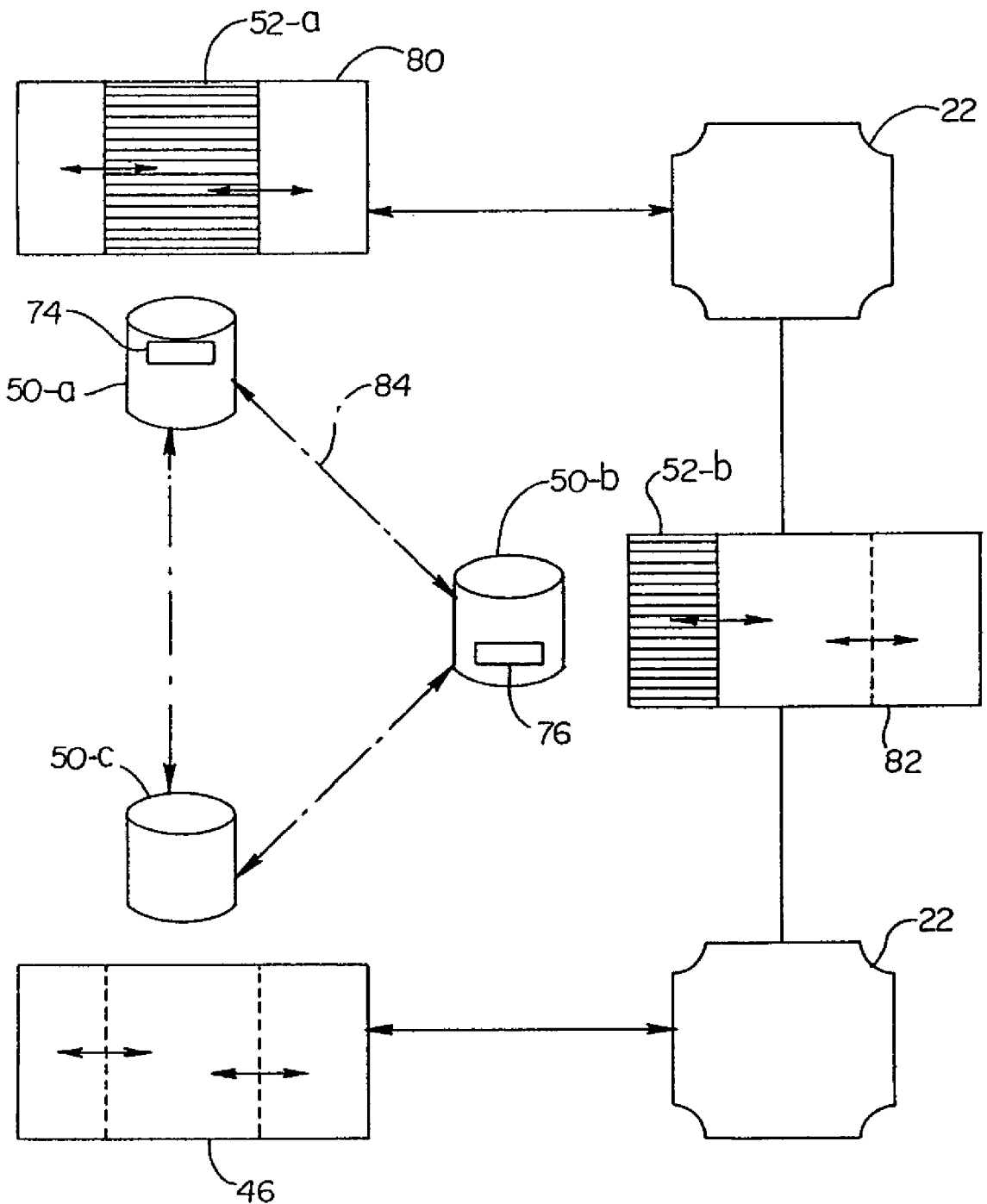
FIG. 9 is a block diagram of an embodiment of the present invention implemented across geographically disparate sites.

In one embodiment of the present invention as shown in FIG. 9 the servers 46 assigned to the first administrative group 52-*a* are located at a first site 80 and the servers 46 assigned to the second administrative group 52-*b* are located at a second site 82 geographically remote from the first site 80. In this embodiment, the system further includes an arrangement for automatically replicating at least data for the first administrative group 52-*a* to the second site 82. In a preferred embodiment, a communication channel 84 separate from the network switches 44 is used to replicate data from the disk storage units 50-*a* at the first site 80 to the disk storage units 50-*b* at the second site 82. The purpose of this arrangement is twofold. First, replication of the data provides redundancy and backup protection that allows for disaster recovery in the event of a disaster at the first site 80. Second, replication of the data at the second site 82 allows the present invention to include the servers 46 located in the second site 82 in the pool of available servers which the master decision software program 72 may use to satisfy increased demand for the hosted services of the first customer by dynamically reallocating these servers to the first administrative group 52-*a*.

The coordination between master decision software programs 72 at the first site 80 and second site 82 is preferably accomplished by the use of a global decision software routine 86 that communicates with the master decision software program 72 at each site. This modular arrangement allows the master decision software programs 72 to focus on managing the server resources at a given site and extends the concept of having each site 80, 82 request additional off-site services from the global decision software routine 86 or offer to make available off-site services in much the same way that the local decision software programs 70 make requests for additional servers or make servers available for reallocation to the master decision software program 70 at a given site.

Preferably, the multi-site embodiment of the present invention utilizes commercially available SAN or NAS storage networking software to implement a two-tiered data redundancy and replication hierarchy. As shown in FIG. 9, the working version 74 of the customer data for the first customer account customer is maintained on the disk storage unit 50 at the first site 80. Redundancy data protection, such as data mirroring, data shadowing or RAID data protection is used to establish a backup version 76 of the customer data for the first customer account at the first site 80. The networking software utilizes the communication channel 84 to generate a second backup version 78 of the customer data for the first customer account located at the second site 82. The use of a communication channel 84 that is separate from the connection of the networks switches 44 to the Internet 22 preferably allows for redundant communication paths and minimizes the impact of the background communication activity necessary to generate the second backup version 78. Alternatively, the backup version 78 of the customer data for the first customer account located at the second site 82 could be routed through the network switches 44 and the Internet 22. In another embodiment, additional backup versions of the customer data could be replicated at additional site locations to further expand the capability of the system to dynamically reallocate servers from customer accounts that are underutilizing these resources to customer accounts in need of these resources.

Figure 10:
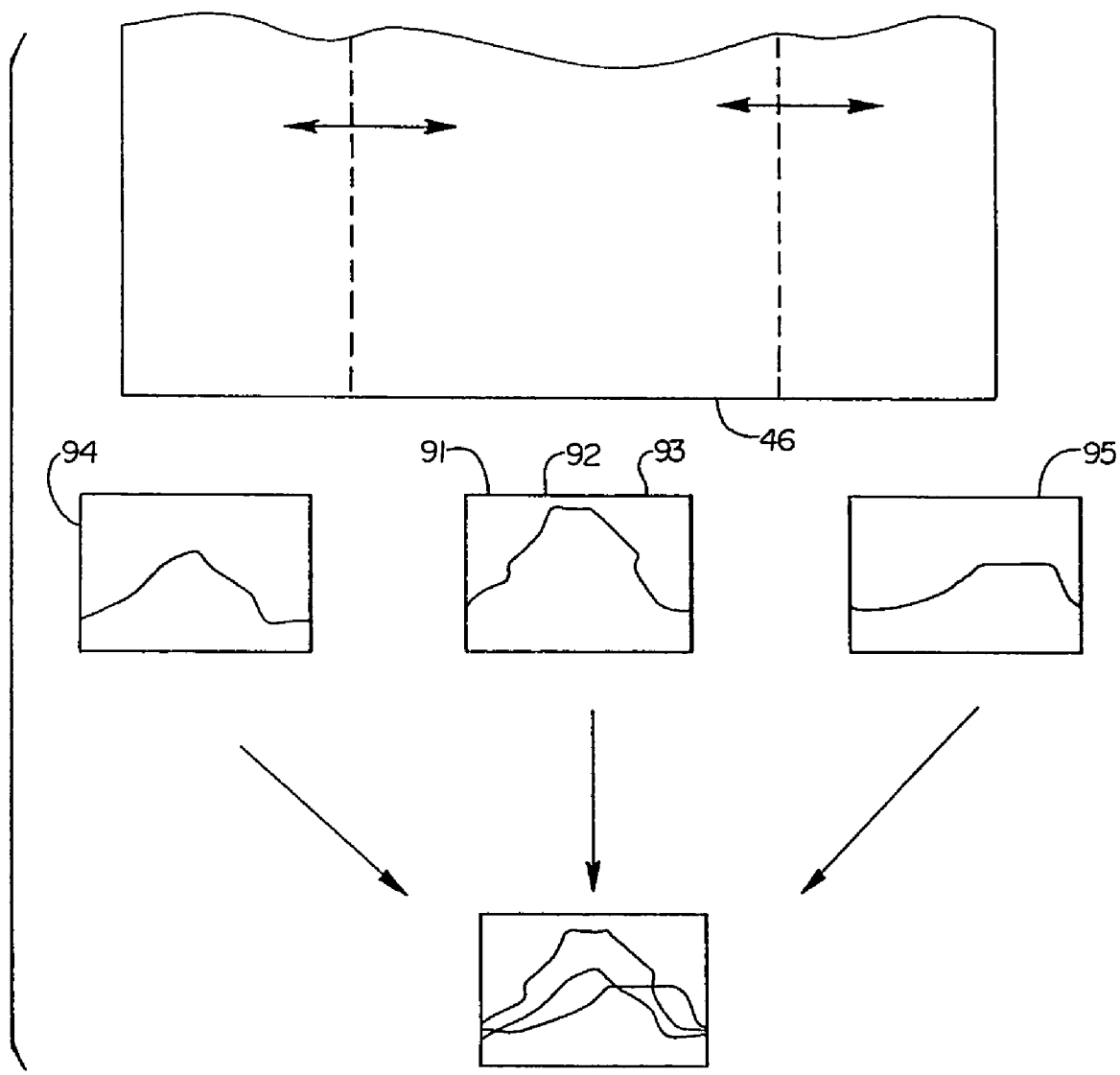
FIG. 10 is a graphic representation of Internet traffic in relation to server capacity for the server farm of the present invention when hosting multiple customer accounts.

As shown in FIG. 10, the ability of the present invention to dynamically reallocate servers from customer accounts that are underutilizing these resources to customer accounts in need of these resources allows for the resources of the server farm 40 to be used more efficiently in providing hosted services to multiple customer accounts. For each of the customer accounts 91, 92, 93, 94 and 95, the overall allocation of servers 46 to each customer account is accomplished such that a relatively constant marginal overcapacity bandwidth is maintained for each customer account. Unlike existing server farms, where changes in hardware resources allocated to a given customer account happen in terms of hours, days or weeks, the present invention allows for up-to-the-minute changes in server resources that are dynamically allocated on an as needed basis. FIG. 10 also shows the advantages of utilizing multiple geographically distinct sites for locating portions of the server farm 40. It can be seen that the peak usages for customer accounts 94 and 95 are time shifted from those of the other customer accounts 91, 92 and 93 due to the difference in time zones between site location 80 and site location 82. The present invention can take advantage of these time shifted differences in peak usages to allocate rolling server capacity to site locations during a time period of peak usage from other site locations which are experiencing a lull in activity.

Figure 13:
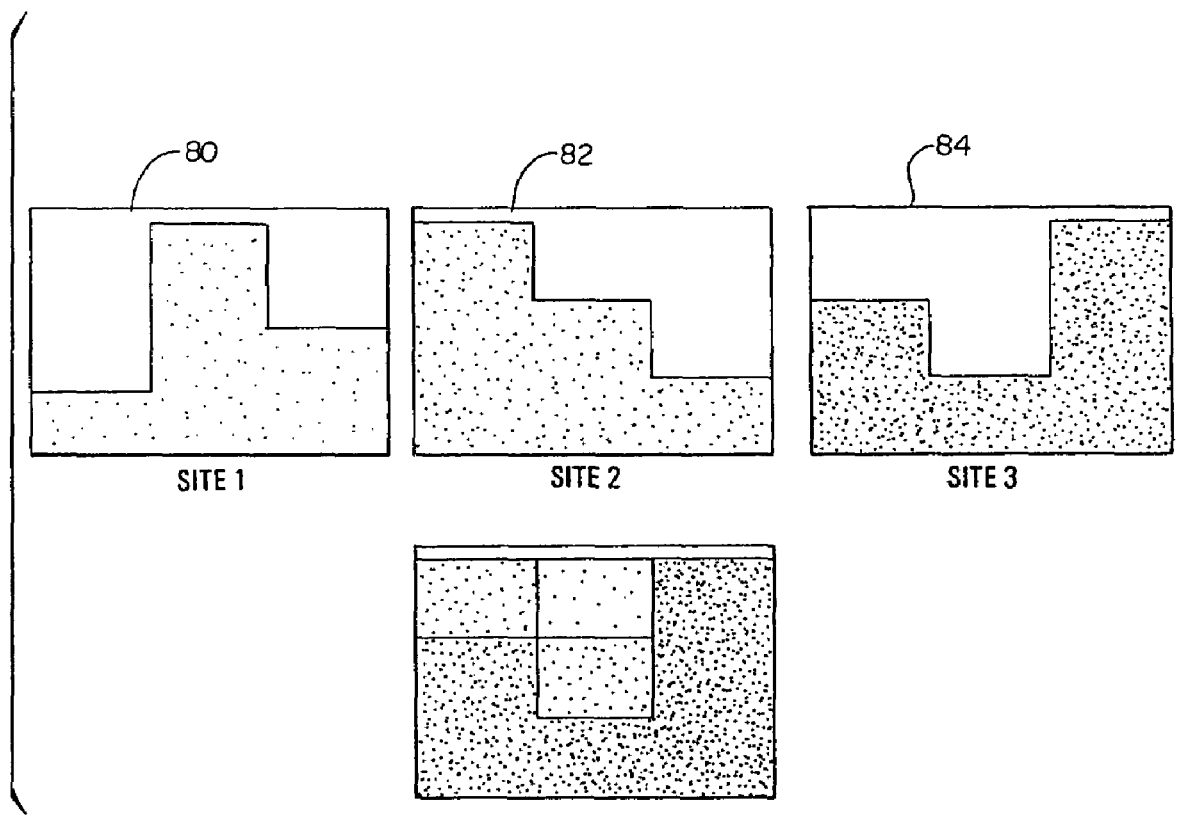
FIG. 13 is a graphic representation of Internet traffic in relation to server capacity for a multi-site embodiment of the present invention.

In one embodiment of the multi-site configuration of the present invention as shown in FIG. 13, at least three separate three separate site locations 80, 82 and 84 are preferably situated geographically at least 24 divided by N+1 hours apart from each other, where N represents the number of distinct site locations in the multi-site configuration. In the embodiment having three separate site locations 80, 82 and 84, the site locations are preferably eight hours apart from each other. The time difference realized by this geographic separation allows for the usage patterns of customer accounts located at all three sites to be aggregated and serviced by a combined number of servers that is significantly less than would otherwise be required if each of the servers at a given location were not able to utilize servers dynamically reallocated from one or more of the other locations. The advantage of this can be seen when site location 80 is experiencing nighttime usage levels, servers from this site location 80 can be dynamically reallocated to site location 82 that is experiencing daytime usage levels. At the same time, site location 84 experiences evening usage levels and may or may not be suited to have servers reallocated from this location to another location or vice versa. Generally, a site location is arranged so as to look to borrow capacity first from a site location that is at a later time zone (i.e., to the east of that site) and will look to make extra capacity available to site locations that are at an earlier time zone (i.e., to the west of that site). Other preferences can also be established depending upon past usage and predicted patterns of use.

Figure 11:
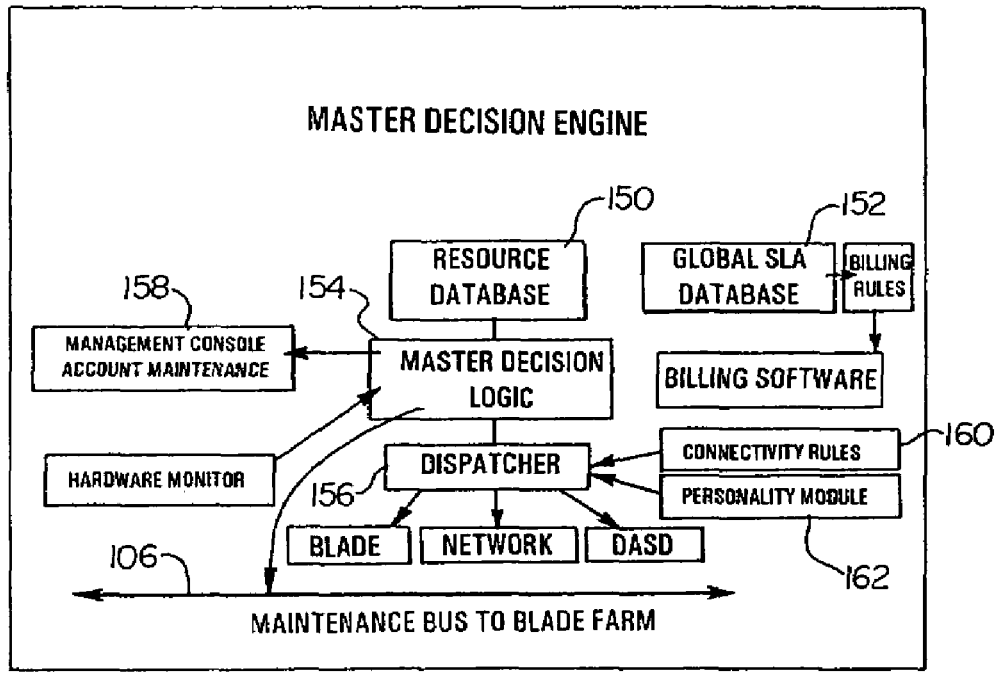
FIG. 11 is a block diagram showing a preferred embodiment of the master decision software program of the present invention.

Referring now to FIG. 11, a preferred embodiment of the master decision software program 72 will be described. The master decision software program 72 includes a resource database 150, a service level agreement database 152, a master decision logic module 154 and a dispatch module 156. The master decision logic module 154 has access to the resource database 150 and the service level agreement database 152 and compares the status information to information in the resource database 150 and the service level agreement database 152 to determine whether to dynamically reallocate servers from the first customer account to the second customer account. The dispatch module 156 is operably linked to the master decision logic module 154 to dynamically reallocate servers when directed by the master decision logic module 154 by using the communication channel 106 to set initialization pointers for the reallocated servers 46' to access software and data unique to the customer account for the second administrative group 52-b and reinitializing the reallocated server 46' such that at least one server joins the second administrative group 52-b. Preferably, the dispatch module 156 includes a set of connectivity rules 160 and a set of personality modules 162 for each server 46. The connectivity rules 160 providing instructions for connecting a particular server 46 to a given network switch 44 or data storage unit 50.

The personality module 162 describes the details of the particular software configuration of the server board 102 to be added to an administrative work group for a customer account. Once the dispatch module 146 has determined the need to reallocate a server, it will evaluate the set of connectivity rules 160 and a set of personality modules 162 to determine how to construct a server 46 that will be dispatched to that particular administrative group 52.

Another way of looking at how the present invention can dynamically provide hosted service across disparate accounts is to view a portion of the servers 46 as being assigned to a pool of a plurality of virtual servers that may be selectively configured to access software and data for a particular administrative group 52. When the dispatch module 146 has determined a need to add a server 46 to a particular administrative group 52, it automatically allocates one of the servers from the pool of virtual servers to that administrative group. Conversely, if the dispatch module determines that an administrative group can relinquish one of its servers 46, that relinquished server would be added to the pool of virtual servers that are available for reallocation to a different administrative group. When the present invention is viewed from this perspective, it will be seen that the group manager software 48 operates to "manufacture" or create one or more virtual servers out of this pool of the plurality of virtual servers on a just-in-time or as-needed basis. As previously described, the pool of virtual servers can either be a warm pool or a cold pool, or any combination thereof. The virtual server is manufactured or constructed to be utilized by the desired administrative group in accordance with the set of connectivity rules 160 and personality modules 162.

In this embodiment, the master decision logic module 152 is operably connected to a management console 158 that can display information about the master decision software program and accept account maintenance and update information to processes into the various databases. A billing software module 160 is integrated into the engine group manager 48 in order to keep track of the billing based on the allocation of servers to a given customer account. Preferably, a customer account is billed at a higher rate for the hosted services when servers are dynamically reallocated to that customer account based on the customer's service level agreement.

Figure 12:
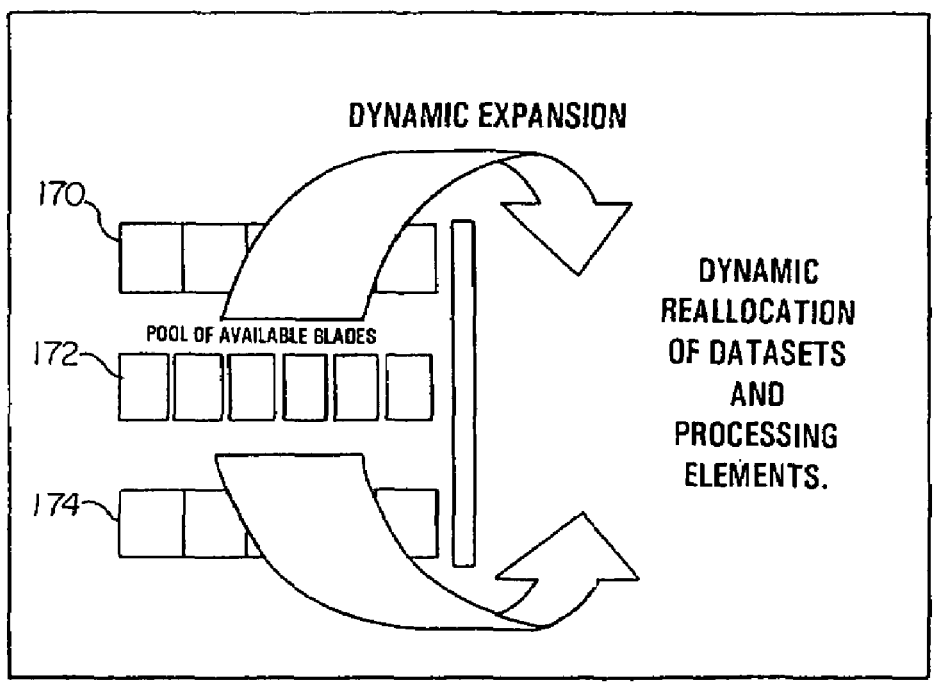
FIG. 12 is a graphic representation of three different service level agreement arrangements for a given customer account.

FIG. 12 shows a representation of three different service level agreement arrangements for a given customer account. In this embodiment, the service level agreements are made for providing hosted services for a given period of time, such as a month. In a first level shown at 170, the customer account is provided with the capacity to support hosted services for 640,000 simultaneous connections. If the customer account did not need a reallocation of servers to support capacity greater than the committed capacity for the first level 170, the customer would be charged to establish rate for that level of committed capacity. In a second level shown at 172, customer account can be dynamically expanded to support capacity of double the capacity at the first level 172. In a preferred embodiment, once the engine group manager 48 has dynamically reallocated servers to the customer account in order to support the second level 172 of capacity to meet a higher than anticipated peak usage, the customer account would be charged a higher rate for the period of time that the additional usage was required. In addition, the customer account could be charged a one-time fee for initiating the higher level of service represented by the second level 172. In one embodiment, charges for the second level 172 of service would be incurred at a rate that is some additional multiple of the rate charged for the first level 170. The second level 172 represents a guaranteed expansion level available to the customer for the given period of time. Finally, a third level 174 provides an optional extended additional level of service that may be able to be brought to bare to provide hosted services for the customer account. In this embodiment, the third level 174 provides up to a higher multiple times the level of service as the first level 170. In one embodiment, in order to provide this extended additional level of service, the host system makes use of the multi-site arrangement as previously described in order to bring in the required number of servers to meet this level of service. Preferably, the customer account is charged a second higher rate for the period of time that the extended additional service is reallocated to this customer account. In one embodiment, charges for the third level 174 of service would be incurred at a rate that is an even larger multiple of the first level 170 for the given period of time that the extended additional third level 174 of service is provided for this customer account. Again, the customer account may be charged a one-time fee for initiating this third level 174 of service at any time during the given period. At the end of a given period, the customer may alter the level of service contracted for the given customer account.

As shown in FIG. 12, the service level agreement is increased by 50% from a first period to a second period in response to a higher anticipated peak usage for the given customer account. Preferably, the period for a service level agreement for a given customer account would be a monthly basis, with suggestions been presented to the customer for recommended changes to the service level agreement for the upcoming billing period. Although this example is demonstrated in terms of simultaneous connections, it should be understood that the service level agreement for a given customer account can be generated in terms of a variety of performance measurements, such as simultaneous connections, hits, amount of data transferred, number of transactions, connect time, resources utilized by different application software programs, the revenue generated, or any combination thereof. It will also be understood that the service level agreement may provide for different levels of commitment for different types of resources, such as front-end servers, back-end servers, network connections or disk storage units.

Figure 15:
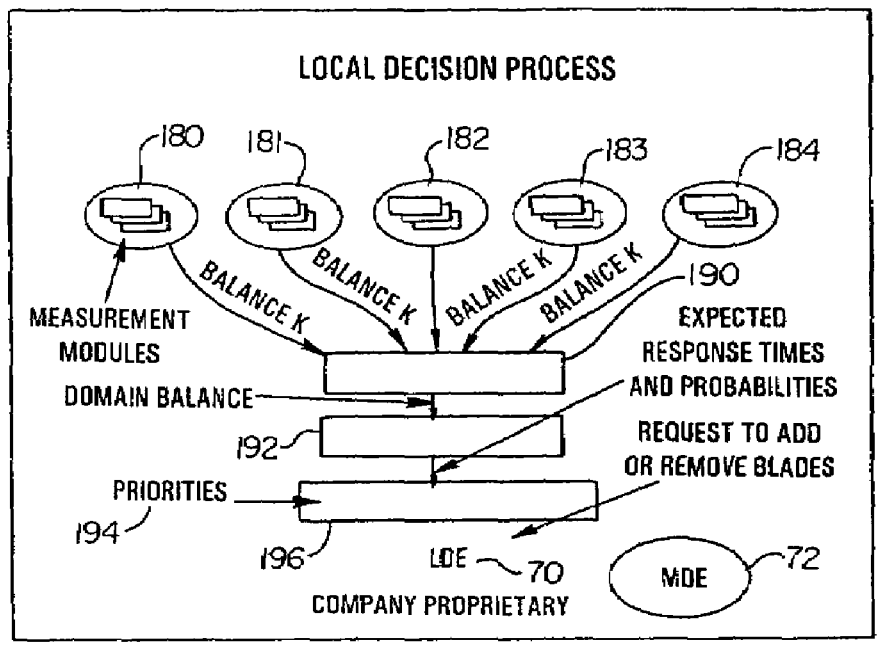
FIG. 15 is a block diagram of the preferred embodiment of the local decision software program.

Referring now to FIG. 15, a block diagram of the preferred embodiment of the local decision software program 70 will be described. A series of measurement modules 180, 181, 182, 183 and 184 each performed independent evaluations of the operation of the particular server on which the local decision software program 70 is executing. Outputs from these measurement modules are provided to an aggregator module 190 of the local decision software program 70. A predictor module 192 generates expected response times and probabilities for various requests. With priority inputs 194 supplied by the master decision software program 72 from the service level agreement database 152, a fuzzy inference system 196 determines whether a request to add an engine blade 104 for the administrative group 52 will be made, or whether an offer to give up or remove an engine blade from the administrative group 52 will be made. The request to add or remove a blade is then communicated over communication channel 106 to the master decision software program 72. In one embodiment, the aggregator module 190 is executed on each server 46 within a given administrative group 52, and the predictor module 192 and fuzzy inference module 196 are executed on only a single server 46 within the given administrative group 52 with the outputs of the various measurement modules 180-184 been communicated to the designated server 46 across the communication channel 106. In another embodiment, the aggregator module 190, predictor module 192 and fuzzy inference module 196 may be executed on more than one server within a given administrative group for purposes of redundancy or distributed processing of the information necessary to generate the request add or remove a blade. Preferably, the aggregator module 190 accomplishes a balancing across the various measurement modules 180-184 in accordance with the formula:

$$B_k = [(\Sigma T_{ki}/w_k) - \min_k]*100/(\max_k - \min_k) - 50 \qquad \text{Equation (1)}$$

$i = 1$ to $W_k$

Where $T_{ki}$ is the time take it for the ith request of measurement type k, $W_k$ is the window size for measurement type k, $\min_k$ is the minimum time expected for measurement type k, and $\max_k$ is the maximum time to be tolerated for a measurement type k. The balanced request rate $B_k$ is then passed to the predictor module 192 and the fuzzy inference module 196 of the local decision software program 70. The window size for the measurement type k would be set to minimize any unnecessary intrusion by the measurement modules 180-184, while at the same time allowing for a timely and adequate response to increases in usage demand for the administrative group 52.

Figure 16:
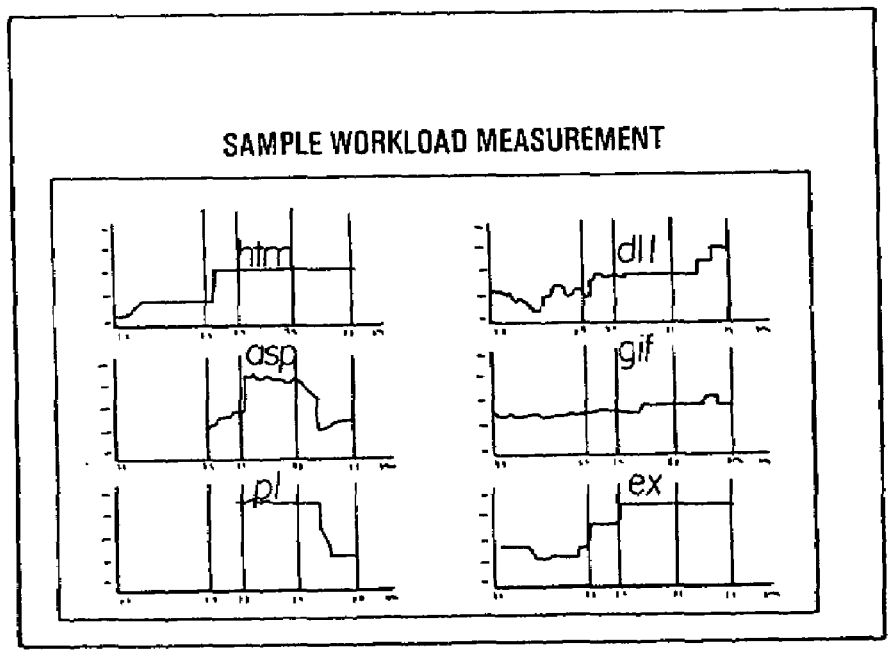
FIG. 16 is a graphic representation of the workload measurements from the various measurement modules of the local decision software program under varying load conditions.

FIG. 16 shows a sample of the workload measurements from the various measurement modules 180-184 under varying load conditions. It can be seen that no single workload measurement provides a constantly predictable estimate of the expected response time and probability for that response time. As such, the fuzzy inference module 196 must consider three fundamental parameters: the predicted response times for various requests, the priority of these requests, and probability of their occurrence. The fuzzy inference module 196 blends all three of these considerations to make a determination as to whether to request a blade to be added or removed from the administrative group 52. An example of a fuzzy inference rule would be:

if (priority is urgent) and (probability is abundant) and (expected response time is too high) then (make request for additional blade).

Figure 17:
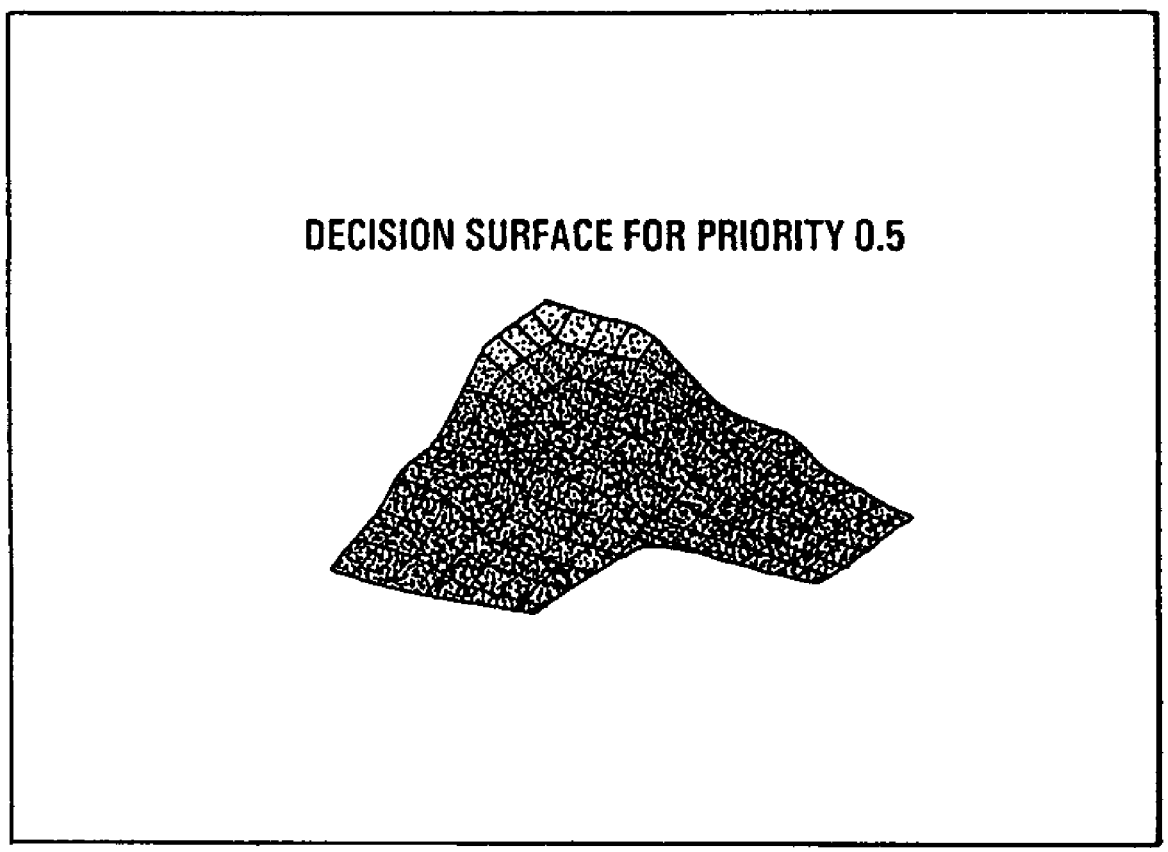
FIG. 17 is a graphic representation of a decision surface generated by the local decision software program to request or remove a server from an administrative group.

Preferably, the end results of the fuzzy inference module 196 is to generate a decision surface contouring the need to request an additional server over the grid of the expected response time vs. the probability of that response time for this administrative group 52. An example of such a decision surface is shown in FIG. 17.

A portion of the disclosure of this invention is subject to copyright protection. The copyright owner permits the facsimile reproduction of the disclosure of this invention as it appears in the Patent and Trademark Office files or records, but otherwise reserves all copyright rights.

Although the preferred embodiment of the automated system of the present invention has been described, it will be recognized that numerous changes and variations can be made and that the scope of the present invention is to be defined by the claims.

What is claimed is:

1. A method for automatically allocating computing resources of a rack-and-blade computer assembly comprising:
    receiving server performance information from an application server pool disposed in a rack of a rack-and-blade computer assembly;
    determining at least one QoS attribute for the application server pool;
    determining that the QoS attribute is below a standard; and
    allocating a blade server from a free server pool for use by the application server pool.

2. The method of claim 1, additionally comprising selecting, prior to allocating for use, a blade server from a free server pool to obtain a selected blade server.

3. The method of claim 2, additionally comprising reconfiguring a traffic management device associated with the application server pool.

4. The method of claim 1, additionally comprising preparing, prior to allocating for use, the selected blade server for operation with the application server pool.

5. The method of claim 4, additionally comprising reconfiguring a traffic management device associated with the application server pool.

6. The method of claim 1, additionally comprising reconfiguring a traffic management device associated with the application server pool.

7. The method of claim 1, additionally comprising provisioning images onto at least one blade server of the application server pool.

8. The method of claim 1, additionally comprising monitoring the performance of at least one blade server of the application server pool from information received by a server agent associated with the blade server.

9. The method of claim 1, additionally comprising removing the use of at least one blade server from the application server pool.

10. The method of claim 1, additionally comprising determining a relative performance of another application server pool.

11. A method for automatically allocating computing resources of a rack-and-blade computer assembly comprising:
   receiving server performance information from an application server pool disposed in a rack of a rack-and-blade computer assembly;
   determining at least one QoS attribute for the application server pool;
   determining that the QoS attribute is above a standard; and
   removing the use of a blade server from the application server pool.

12. The method of claim 11, additionally comprising allocating the use of the removed blade server for use by a free server pool.

13. The method of claim 11, additionally comprising provisioning images onto at least one blade server of the application server pool.

14. The method of claim 11, additionally comprising monitoring the performance of at least one blade server of the application server pool from information received by a server agent associated with the blade server.

15. A method for automatically allocating computing resources of a rack-and-blade computer assembly comprising:
   receiving server performance information from an application server pool disposed in a rack of a rack-and-blade computer assembly;
   determining at least one QoS attribute for the application server pool;
   determining that the QoS attribute is below a standard;
   determining that a free server pool has a blade server for use; and
   selecting from the free server pool the available blade server for use by the application server pool.

16. The method of claim 15, additionally comprising installing software on the selected available blade server.

17. The method of claim 16, additionally comprising configuring the selected available blade server.

18. The method of claim 16, additionally comprising readying the selected available blade server for operation.

19. The method of claim 15, additionally comprising configuring the selected available blade server.

20. The method of claim 15, additionally comprising readying the selected available blade server for operation.

21. The method of claim 15, additionally comprising reconfiguring a traffic management device associated with the application server pool.

22. The method of claim 15, additionally comprising provisioning images onto at least one blade server of the application server pool.

23. The method of claim 15, additionally comprising monitoring the performance of at least one blade server of the application server pool from information received by a server agent associated with the blade server.

24. The method of claim 15, additionally comprising removing the use of at least one blade server from the application server pool.

25. The method of claim 15, additionally comprising determining a relative performance of another application server pool.

26. An article of manufacture comprising:
   a machine-readable storage medium having stored thereon instructions for:
      receiving server performance information from an application server pool disposed in a rack of a rack-and-blade computer assembly;
      determining at least one QoS attribute for the application server pool;
      determining that the QoS attribute is above a standard; and
      removing the use of a blade server from the application server pool.

27. An article of manufacture comprising:
   a machine-readable storage medium having stored thereon instructions for:
      receiving server performance information from an application server pool disposed in a rack of a rack-and-blade computer assembly;
      determining at least one QoS attribute for the application server pool;
      determining that the QoS attribute is above a standard; and
      removing the use of a blade server from the application server pool.

28. An article of manufacture comprising:
   a machine-readable storage medium having stored thereon instructions for:
      receiving server performance information from an application server pool disposed in a rack of a rack-and-blade computer assembly;
      determining at least one QoS attribute for the application server pool;
      determining that the QoS attribute is below a standard;
      determining that a free server pool has a blade server for use; and
      selecting from the free server pool the available blade server for use by the application server pool.

* * * * *

(12) EX PARTE REEXAMINATION CERTIFICATE (9297th)
United States Patent
Sheets et al.

(10) Number: US 7,693,993 C1
(45) Certificate Issued: Sep. 11, 2012

(54) METHOD AND SYSTEM FOR PROVIDING DYNAMIC HOSTED SERVICE MANAGEMENT ACROSS DISPARATE ACCOUNTS/SITES

(75) Inventors: Kitrick B. Sheets, Eau Claire, WI (US); Philip S. Smith, Monterey, CA (US); Stephen J. Engel, East Northport, NY (US); Yuefan Deng, Setauket, NY (US); Joseph Guistozzi, Plainview, NY (US); Alexander Korobka, Holtsville, NY (US)

(73) Assignee: Galactic Computing Corporation, Chai Wan Industrial District (HK)

Reexamination Request:
No. 90/011,784, Jul. 28, 2011

Reexamination Certificate for:
Patent No.: 7,693,993
Issued: Apr. 6, 2010
Appl. No.: 10/984,959
Filed: Nov. 8, 2004

Related U.S. Application Data

(63) Continuation of application No. 09/710,095, filed on Nov. 10, 2000, now Pat. No. 6,816,905.

(51) Int. Cl.
*G06F 15/16* (2006.01)

(52) U.S. Cl. .................. 709/226; 709/229; 718/106
(58) Field of Classification Search .................. None
See application file for complete search history.

(56) References Cited

To view the complete listing of prior art documents cited during the proceeding for Reexamination Control Number 90/011,784, please refer to the USPTO's public Patent Application Information Retrieval (PAIR) system under the Display References tab.

*Primary Examiner* — Simon Ke

(57) ABSTRACT

A hosted service provider for the Internet is operated so as to provide dynamic management of hosted services across disparate customer accounts and/or geographically distinct sites.

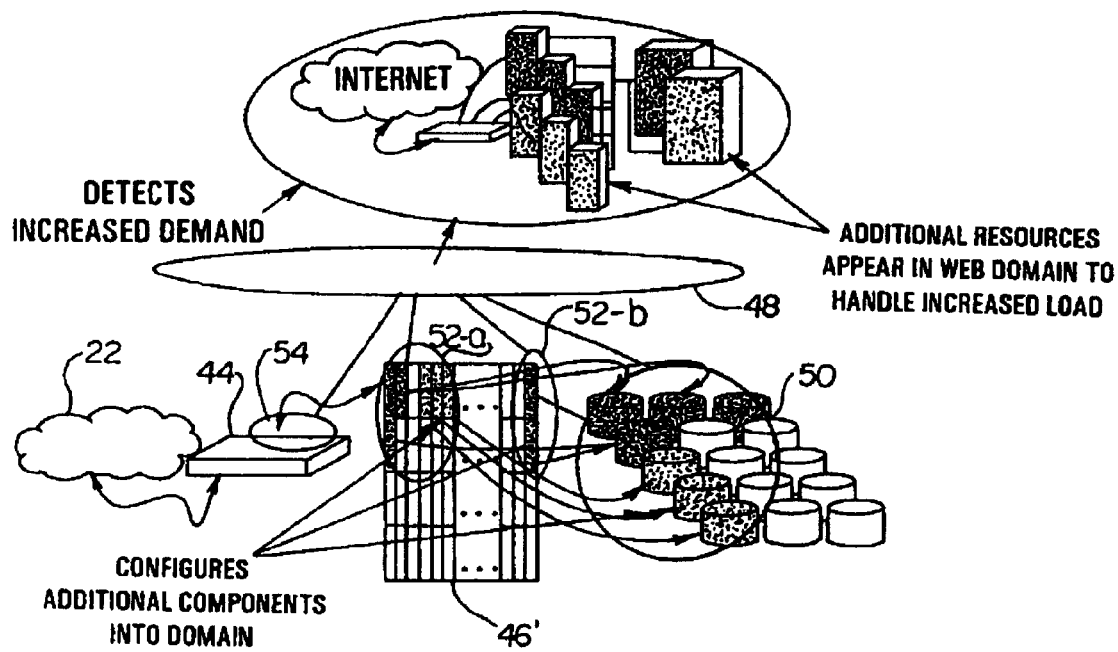

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 6, 17-20 and 26 are cancelled.

Claims 1, 3-5, 7-11, 13-16, 21-25 and 27-28 are determined to be patentable as amended.

Claims 2 and 12, dependent on an amended claim, are determined to be patentable.

New claims 29-37 are added and determined to be patentable.

1. A method for automatically allocating computing resources of a rack-and-blade computer assembly comprising:
   receiving server performance information from an application server pool disposed in a rack of a rack-and-blade computer assembly, *the application server pool being selectively configured to access software and data for one of a plurality of administrative groups that are each associated with a unique customer account, each customer account having a separately executed service level agreement to provide hosted services unique to that customer account*;
   determining at least one QoS attribute for the application server pool *that is representative of server performance information for the administrative group of the application server pool*;
   determining that the QoS attribute is below a standard [and] *as defined by the service level agreement with the customer account for the administrative group of the application server pool*;
   allocating a blade server from a free server pool for use by the *administrative group of the* application server pool *to obtain an allocated blade server; and*
   *preparing the allocated blade server from the free server pool for operation with the administrative group of application server pool by automatically configuring the allocated blade server to access software and data for the customer account for the administrative group of the application server pool.*

3. The method of claim 2, additionally comprising reconfiguring a traffic management device associated with *the administrative group of* the application server pool.

4. The method of claim [1] *2, wherein* preparing[, prior to allocating for use,] the selected blade server for operation with *the administrative group of* the application server pool occurs prior to allocating the blade server.

5. The method of claim 4, additionally comprising reconfiguring a traffic management device associated with *the administrative group of* the application server pool.

7. The method of claim 1, [additionally comprising] *wherein preparing the allocating blade server includes* provisioning images onto at least one blade server of *the administrative group of* the application server pool.

8. The method of claim 1, additionally comprising monitoring the performance of at least one blade server of *the administrative group of* the application server pool from information received by a server agent associated with the blade server.

9. The method of claim 1, additionally comprising removing the use of at least one blade server from *the administrative group of* the application server pool.

10. The method of claim 1, additionally comprising determining a relative performance of another application server pool *for another of the plurality of administrative groups associated with a different unique customer account*.

11. A method for automatically allocating computing resources of a rack-and-blade computer assembly comprising:
   receiving server performance information from an application server pool disposed in a rack of a rack-and-blade computer assembly, *the application server pool being selectively configured to access software and data for one of a plurality of administrative groups that are each associated with a unique customer account, each customer account having a separately executed service level agreement to provide hosted services unique to that customer account*;
   determining at least one QoS attribute for the application server pool *that is representative of server performance information from the administrative group of the application server pool*;
   determining that the QoS attribute is above a standard *as defined by the service level agreement with the customer account for the administrative group of the application server pool*; and
   removing the use of a blade server from *the administrative group of* the application server pool *to obtain a removed blade server that has no access to software and data for the customer account for the administrative group of the application server pool.*

13. The method of claim 11, additionally comprising provisioning images onto[at least one] *the removed* blade server *to access to software and data for a customer account of another administrative group* of [the] *another* application server pool *that is different than the customer account of the adminstrative group before removing the removed blade server.*

14. The method of claim 11, additionally comprising monitoring the performance of at least one blade server of *the administrative group of* the application server pool from information received by a server agent associated with the blade server.

15. A method for automatically allocating computing resources of a rack-and-blade computer assembly comprising:
   receiving server performance information from an application server pool disposed in a rack of a rack-and-blade computer assembly, *the application server pool being selectively configured to access software and data for one of a plurality of administrative groups that are each associated with a unique customer account, each customer account having a separately executed service level agreement to provide hosted services unique to that customer account*;
   determining at least one QoS attribute for the application server pool *that is representative of server performance information from the administrative group of the application server pool*;

determining that the QoS attribute is below a standard *as defined by the service level agreement with the customer account for the administrative group of the application server pool*;

determining that a free server pool has [a] *an available* blade server for use; and selecting from the free server pool the available blade server for use by *the administrative group of* the application server pool *to obtain a selected blade server;* and

*preparing the selected blade server from the free server pool for operation with the administrative group of the application server pool by automatically configuring the allocated blade server to access software and data for the customer account for the administrative group of the application server pool.*

16. The method of claim 15, additionally comprising installing software *for the customer account for the administrative group of the application server pool* on the selected available blade server.

21. The method of claim 15, additionally comprising reconfiguring a traffic management device associated with *the administrative group of* the application server pool.

22. The method of claim 15, additionally comprising provisioning images onto at least one blade server of *the administrative group of* the application server pool.

23. The method of claim 15, additionally comprising monitoring the performance of at least one blade server of *the administrative group of* the application server pool from information received by a server agent associated with the blade server.

24. The method of claim 15, additionally comprising removing the use of at least one blade server from *the administrative group of* the application server pool.

25. The method of claim 15, additionally comprising determining a relative performance of another application server pool *for another of the plurality of administrative groups associated with a different unique customer account.*

27. An article of manufacture comprising:

a machine-readable storage medium having stored thereon instructions for:

receiving server performance information from an application server pool disposed in a rack of a rack-and-blade computer assembly, *the application server pool being selectively configured to access software and data for one of a plurality of administrative groups that are each associated with a unique customer account, each customer account having a separately executed service level agreement to provide hosted services unique to that customer account*;

determining at least one QoS attribute for the application server pool *that is representative of server performance information from the administrative group of the application server pool*;

determining that the QoS attribute is above a standard [and] *as defined by the service level agreement with the customer account for the administrative group of the application server pool*;

removing the use of a blade server from *the administative group of* the application server pool *to obtain a removed blade server that has no access to software and data for the customer account for the administrative group of the application server pool; and* provisioning images onto the removed blade server to access to software and data for a customer account of another administrative group of another application server pool that is different than the customer account of the administrative group before removing the removed blade server.

28. An article of manufacture comprising:

a machine-readable storage medium having stored thereon instructions for:

receiving server performance information from an application server pool disposed in a rack of a rack-and-blade computer assembly, *the application server pool being selectively configured to access software and data for one of a plurality of administrative groups that are each associated with a unique customer account, each customer account having a separately executed service level agreement to provide hosted services unique to that customer account*;

determining at least one QoS attriute for the application server pool *that is representative of server performance information from the administrative group of the application server pool*;

determining that the QoS attribute is below a standard *as defined by the service level agreement with the customer account for the administrative group of the application server pool*;

determining that a free server pool has [a] *an available* blade server for use; and selecting from the free server pool the available blade server for use by *the administrative group of* the application server pool *to obtain a selected blade server;* and

*preparing the selected blade server from the free server pool for operation with the administrative group of the application server pool by automatically configuring the allocated blade server to access software and data for the customer account for the administrative group of the application server pool.*

*29. The method of claim 1, wherein the server performance information includes simultaneous connections, hits, amount of data transferred, number of transactions, connect time, resources utilized by different applications software programs, revenue generated, or any combination thereof.*

*30. The method of claim 11, wherein the server performance information includes simultaneous connections, hits, amount of data transferred, number of transactions, connect time, resources utilized by different applications software programs, revenue generated, or any combination thereof.*

*31. The method of claim 15, wherein the server performance information includes simultaneous connections, hits, amount of data transferred, number of transactions, connect time, resources utilized by different applications software programs, revenue generated, or any combination thereof.*

*32. The article of manufacture of claim 27, wherein the server performance information includes simultaneous connections, hits, amount of data transferred, number of transactions, connect time, resources utilized by different applications software programs, revenue generated, or any combination thereof.*

*33. The article of manufacture of claim 28, wherein the server performance information includes simultaneous connections, hits, amount of data transferred, number of transactions, connect time, resources utilized by different applications software programs, revenue generated, or any combination thereof.*

*34. The article of manufacture of claim 27, wherein the machine-readable storage medium having stored thereon instruction additionally includes instructions for:*

*allocating the use of the removed blade server for use by a free server pool.*

35. The article of manufacture of claim 28, wherein the machine-readable storage medium having stored thereon instructions additionally include instructions for:
reconfiguring a traffic management device associated with the administrative group of the application server pool.

36. The article of manufacture of claim 28, wherein the machine-readable storage medium having stored thereon instructions additionally include instructions for:
provisioning images onto at least one blade server of the administrative group of the application server pool.

37. The article of manufacture of claim 28, wherein the machine-readable storage medium having stored thereon instructions additionally include instructions for:
determining a relative performance of another application server pool for another of the plurality of administrative groups associated with a different unique customer account.

\* \* \* \* \*